(12) United States Patent
Lévay et al.

(10) Patent No.: US 12,325,798 B1
(45) Date of Patent: Jun. 10, 2025

(54) COMPOSITIONS CONTAINING LIGNOCELLULOSIC BIOMASS RESIDUES, POLYMER COMPOSITES MADE THEREFROM, AND METHODS OF MAKING LIGNOCELLULOSIC BIOMASS RESIDUES AND POLYMER COMPOSITES CONTAINING THEM

(71) Applicant: Plantoon Technologies Kft., Martonvásár (HU)

(72) Inventors: Krisztina Lévay, Tiszaföldvár (HU); Noémi Petrovics, Gyöngyös (HU); Soma Bedö, Budapest (HU); Tímea Borosné Stumphauser, Budapest (HU)

( * ) Notice: Subject to any disclaimer, the term of this patent is extended or adjusted under 35 U.S.C. 154(b) by 0 days.

(21) Appl. No.: 18/529,949

(22) Filed: Dec. 5, 2023

Related U.S. Application Data

(62) Division of application No. 18/365,488, filed on Aug. 4, 2023.

(51) Int. Cl.
| | |
|---|---|
| C08H 8/00 | (2010.01) |
| C08L 1/02 | (2006.01) |
| C08L 67/04 | (2006.01) |
| C08L 97/00 | (2006.01) |
| C11B 1/10 | (2006.01) |

(52) U.S. Cl.
CPC .............. C08L 97/005 (2013.01); C08H 8/00 (2013.01); C08L 1/02 (2013.01); C08L 67/04 (2013.01); C11B 1/10 (2013.01); C08L 2201/06 (2013.01); C08L 2205/025 (2013.01); C08L 2205/035 (2013.01)

(58) Field of Classification Search
None
See application file for complete search history.

(56) References Cited

U.S. PATENT DOCUMENTS

| | | | |
|---|---|---|---|
| 4,918,167 A | 4/1990 | Glasser et al. | |
| 5,730,837 A * | 3/1998 | Black | D21C 11/0007 |
| | | | 162/77 |
| 11,553,715 B2 | 1/2023 | Shi et al. | |
| 2007/0161095 A1* | 7/2007 | Gurin | C12P 7/10 |
| | | | 435/161 |
| 2016/0130408 A1 | 5/2016 | Jansen et al. | |
| 2016/0264775 A1* | 9/2016 | Fagan | C08L 67/04 |
| 2019/0093184 A1* | 3/2019 | Carlson | C12P 19/02 |
| 2019/0144590 A1 | 5/2019 | Epps, III et al. | |

FOREIGN PATENT DOCUMENTS

CZ   309724 B6   8/2023

OTHER PUBLICATIONS

Sugarcane bagasse cellulose / HDPE composites obtained by extrusion, Composites Science and Technology, 69, (2009) 214 219, Mulinari et al. (Year: 2009).*
McKendry, Peter, "Energy production from biomass (part 1): overview of biomass", Bioresource Technology, 2002, vol. 83, pp. 37-46.
Solvent Miscibility Chart, 2024.

\* cited by examiner

*Primary Examiner* — Peter A Salamon
(74) *Attorney, Agent, or Firm* — Pillsbury Winthrop Shaw Pittman LLP

(57) ABSTRACT

This disclosure relates to extraction methods for compatibilizing lignocellulosic biomass and residues thereof with polymers to produce value-added composites therefrom and other value-added products generated during the extraction methods.

7 Claims, 17 Drawing Sheets

Week 0            Week 12

COMPOSITIONS CONTAINING LIGNOCELLULOSIC BIOMASS RESIDUES, POLYMER COMPOSITES MADE THEREFROM, AND METHODS OF MAKING LIGNOCELLULOSIC BIOMASS RESIDUES AND POLYMER COMPOSITES CONTAINING THEM

CROSS-REFERENCE TO RELATED APPLICATIONS

This application is a divisional of U.S. patent application Ser. No. 18/365,488, filed on Aug. 4, 2023, which is incorporated herein in its entirety by reference.

BACKGROUND

Plant matter contains a variety of useful organic compounds. A number of consumable plant-based materials are discarded after a single use, or discarded entirely as useless waste. Plant-based material waste can be recycled and used in various methods, including reinforcements for plastic material, aerobic and non-aerobic aeration and extraction, food additives, and the like.

Current extracting methods from plant matter usually require additional processing steps, such as drying and multiple reaction steps. The additional processing can incur extra costs, and may create undesirable by-products during processing. Furthermore, current methods of using plant matter may require undesirable additives and additional time and money to improve the final product.

The use of bio-based agents/lignocellulosic biomass to produce biopolyester-based biocomposites has become one of the important investment trends. These lignocellulosic materials are commonly incorporated into the polymer matrix, thus enhancing its mechanical properties and stability. However, due to the hydrophilic nature of these materials and their high tendency to adsorb water from the environment, little work has been done to investigate their barrier properties. The fiber/matrix adhesion is an important criterion in determining the barrier properties. The main components of natural fibers are cellulose and hemicellulose, in which hydroxyl and carboxyl groups predominate. Due to their easy connection to water molecules through hydrogen bonding, these functional groups are hydrophilic in nature. Moreover, the very low affinity with hydrophobic polymers (i.e., PLA) further hinders the formation of a well-dispersed system, which is one of the key factors for an efficient barrier. Many experiments have been carried out on the use of natural fibers as fillers for the production of various types of composites. However, the lack of good interfacial adhesion, low melting point and poor resistance to moisture make the use of natural filled composites less attractive. In plant-based natural filled polymer composites, filler aggregation and/or weak interfacial adhesion between the filler particles and the polymer matrix can be observed. Both phenomena lead to insufficient homogeneity, stiffness, and low impact strength.

In order to improve the compatibility between the components, in most processes natural fillers (with free OH groups) may be chemically surface modified with coupling agents. Chemical bonded interface is the most widely discussed in these filled polymer composites. Chemical modifications could be done on both fiber and matrix in order to gain higher intensity of chemical bonding sites. Improved hydrophobicity of fibers could increase the adhesive compatibility with hydrophobic matrix and this could be done by removing fiber's hydroxyl groups and substitutes with hydrophobic chemical bonding. The chemical treatments include alkaline treatment, silane treatment, acetylation, benzoylation, peroxide treatment, use of maleated coupling agents and permanganate treatment. The aim of these treatments is to increase the interfacial bonding strength between the natural fibers and the polymer matrix, either by forming covalent bonds or by mechanical interlocking.

There exists a need for effective and economical methods of using plant matter or plant-based material waste, and for creating value-added products therefrom.

The foregoing description is not intended in any way as an admission that any of the content described therein is prior art to the present disclosure. Moreover, the description herein of any disadvantages associated with the described products, methods, and/or apparatus, is not intended to limit the embodiments. Indeed, aspects of the embodiments may include certain features of the described products, methods, and/or apparatus without suffering from their described disadvantages.

SUMMARY

In various embodiments, the disclosure provides a method for extracting organic compounds from lignocellulosic biomass which includes providing the lignocellulosic biomass to a reaction vessel, contacting the lignocellulosic biomass with a first solvent and a second solvent in the reaction vessel, the first solvent and the second solvent being immiscible with one another. The method further includes mixing the first and second solvent with the lignocellulosic biomass in the reaction vessel for a sufficient period of time to provide a solvent-lignocellulosic biomass mixture. In an embodiment, the method further includes forming a three-phase system from the solvent-lignocellulosic biomass mixture which includes the following phases: (i) a first phase including a lipid-rich phase having a lipid fraction and the first solvent; (ii) a second phase including a polyphenol-rich phase having a polyphenol fraction and the second solvent; and (iii) a third phase including a solid fraction having solid lignocellulosic biomass substantially free of the lipid fraction and the polyphenol fraction. In an embodiment, the method further involves isolating the first phase and removing the first solvent from the lipid-rich phase to produce a lipid fraction, and isolating the second phase and removing the second solvent from the polyphenol-rich phase to produce a polyphenol fraction.

In one embodiment, forming a three-phase system from the solvent-lignocellulosic biomass mixture includes allowing the solvent-lignocellulosic biomass mixture to rest for a period of time sufficient to produce the three-phase system. Another embodiment includes hydrolyzing the third phase to produce a lignocellulosic biomass residue, where the hydrolyzing can be an acid hydrolysis; an alkaline hydrolysis; an enzymatic hydrolysis, or a combination of thereof. In one embodiment, the hydrolysis includes at least one acid hydrolysis.

In another embodiment, the hydrolyzing is an alkaline hydrolysis followed by an acid hydrolysis, followed by an enzymatic hydrolysis. In yet another embodiment, the hydrolyzing removes hemicellulose, cellulose, monosaccharides, and/or polysaccharides. In one embodiment, the hemicellulose, cellulose, monosaccharides, polysaccharides and lignin fractions are partially hydrolysed. In certain embodiments the so-produced lignocellulosic biomass residue includes a solid biomass substantially free of the first solvent, the second solvent, lipids, polyphenols, hemicellulose, cellulose, monosaccharides, polysaccharides.

In certain embodiments, the lignocellulosic biomass may have a moisture content of from about 2% to about 90% and may include coffee beans or used coffee grounds. Other embodiments include using an organic nonpolar solvent as the first solvent, and using an organic polar solvent or water or a mixture thereof as the second solvent. In another embodiment, the first solvent is hexane and the second solvent is 50% (v/v) aqueous acetonitrile.

In certain embodiments, the mixing provides phase contact between the lignocellulosic biomass and the first and second solvents, wherein the mixing includes stirring from about 10 to about 10,000 rpm at a temperature of from about 20° C. to about 300° C. for a period of time of from about 1 minute to about 120 hours. In another embodiment, the extracting proceeds in one reaction vessel in one step.

In various embodiments, the disclosure provides a lignocellulosic biomass (LCB) residue. In certain embodiments, the LCB residue is substantially free of lipids and/or polyphenols and/or hemicellulose and/or cellulose, as well as any solvents used in its preparation. In certain embodiments the LCB residue includes a lipid content below 20%, below 15%, below 10%, or below 5%. In certain embodiments, the LCB residue includes a lipid content below 4%. In certain embodiments the LCB residue includes a polyphenol content below 20%, below 15%, below 10%, or below 5%. In certain embodiments, the LCB residue includes a polyphenol content below 4.5%. In certain embodiments, the LCB residue includes a lignin content ranging from about 0% to about 100%, or from about 5% to about 90%, or from about 10% to about 85%, or from about 20% to about 80%, or from about 30% to about 80%. In certain embodiments, the LCB residue includes a hemicellulose content ranging from about 0% to about 60%, or from about 1% to about 50%, or from about 2% to about 40%, or from about 5% to about 35%, or from about 10% to about 30%. In certain embodiments, the LCB residue includes a cellulose content ranging from about 0% to about 60%, or from about 1% to about 50%, or from about 2% to about 40%, or from about 5% to about 35%, or from about 10% to about 30%, or from about 5% to about 50%. In certain embodiments, the LCB residue includes a lipid content of less than 4%, a polyphenol content below 4.5%, a lignin content ranging from about 30% to about 80%, a hemicellulose content ranging from about 10% to about 30%, and a cellulose content ranging from about 10% to about 30%, where each percentage is by weight of the total residue.

In one embodiment, the lignocellulosic biomass residue has a moisture content of from about 0% to about 30%, or from about 0% to about 20%, or from about 0% to about 15%, where each percentage is by weight of the total residue. In an embodiment, the lignocellulosic biomass residue is prepared by a method disclosed herein, and is substantially free of lipids and polyphenols.

In one embodiment, the lignocellulosic biomass residue has a lignin content from about 40% to about 80%, a lipid content less than about 4%, a polyphenol content less than about 3.5%, a hemicellulose content in the range of from about 4% to about 20%, and a cellulose content in the range of from about 10% to about 45%, where each percentage is by weight of the total residue.

In certain embodiments, the method further includes grinding the lignocellulosic biomass residue to reduce its particle size. In certain embodiments, the average particle size of a lignocellulosic biomass residue is in a range of from about 0.1 μm to 2000 m, or from about 0.1 to about 1500 μm.

In other embodiments, the disclosure provides a method for compounding the lignocellulosic biomass residue with a polymer to produce a biopolymer, including a biopolymer product, that includes adding the lignocellulosic biomass residue and the polymer to a compounding vessel, where the lignocellulosic biomass residue is substantially free of lipids, polyphenols, hemicellulose, and cellulose, and compounding the lignocellulosic biomass residue with the polymer to produce a compounded biomass-polymer blend. The compounded biomass-polymer blend is a biopolymer and may be in the form of granules, flakes, pellets, and the like, and may be useful in the production of a variety of polymer products (films, textiles, bottles, component parts, and the like). The method may optionally further include processing the compounded biomass-polymer blend to produce a biopolymer product for specific applications.

In certain embodiments, the amount of lignocellulosic biomass residue is present in an amount within the range of from less than 1% to about 60%, or from about 1% to about 50%, or from about 1% to about 45%, or from about 1% to about 30% by weight of the compounded biomass-polymer blend.

In another embodiment, the description provides a biopolymer product and/or compounded biomass-polymer blend that includes an amount of lignocellulose biomass residue sufficient to reduce the oxygen transmission rate and water vapor transmission rate by at least a two-fold, when compared to the polymer alone. In an embodiment, the biopolymer product and/or the compounded biomass-polymer blend, comprises a biomass/polymer interface having an interfacial shear strength of from about 0.01 to about 300 MPa, In various embodiments, a suitable polymer to be used to form the biopolymer compounded biomass-polymer blend can be selected from the group consisting of polyacrylic acids, polyalcohols, polyalkylenes, polyalkylene oxides, poly(alkyl)acrylates, poly(alkylene) vinyl alcohols, polyamides, polycarbonates, polydepsipeptides, polydihydropyrans, poly(ester anhydrides), polyesteramides, polyesters, polyethers, polyhydroxyacids, polymeric carbohydrates, polyorthoesters, polypeptides, polyphosphates, polypyrrolidones, polysaccharide derivatives, polysaccharides, polyurethanes, polyvinylalcohols, copolymers thereof; terpolymers thereof; mixtures thereof and combinations thereof.

In another embodiment, the compounded biomass-polymer blend and/or the biopolymer product includes the lignocellulosic biomass residue in an amount of from about 0% to about 90%, or from about 0.5% to about 80%. In an additional embodiment, the compounded biomass-polymer blend and/or the biopolymer product further includes at least one component selected from acid scavengers, activated carbon, additives, adhesives, adsorbents, agglomerants, antiaging agents, antifogging agents, anti-hydrolysis agents, antioxidants, anhistatic agents, aromatic chemicals, binders, biocides, brighteners, carbohydrates, catalysts, chain extenders, clays, coatings, colorants, complexing agents, coupling agents, crosslinking agents, crystallization accelerators, crystallization retarders, cyclodextrins, delustering agents, dyes, elastomers, electromagnetic radiation absorbers, electromagnetic radiation stabilizers, emulsifiers, enzymes, expanders, extenders, fibers, fillers, films, flame retardants, flocculants, fluorescent brightening agents, foams, fuels, glide agents, glues, gums, impact modifiers, indicators, lubricants, minerals, monomer or other starting substances, natural biopolymers, nonbiodegradable components, nonbiological components, nucleating agents, odor masking agents, oligomers, organic and inorganic pigments, paints, pelletizing additives, plasticizers, plastics, polymer production aids, polymerization aids, polysaccharides, powders, processing aids, proteins, release agents, resins, rubbers, salts, sand, sequestrants, slip agents, stabilizers, starches, surfactants, tackifying resins, thermal stabilizers, toxin binders, viscosity stabilizers, waxes, mixtures thereof and combinations thereof.

In various embodiments, the disclosure provides a biopolymer product and/or compounded biomass-polymer blend including a lignocellulosic biomass residue in an amount of from about 1% to about 45% by weight, where the lignocellulosic biomass residue has a moisture content of from about 0% to about 15% by weight and comprises lignin in an amount of from about 10% to about 85% by weight, lipids in an amount of less than about 10% by weight, polyphenols in an amount of less than about 5% by weight, hemicellulose in an amount of from about 1% to about 25% by weight and cellulose in an amount of from about 5% to about 50% by weight, where the biopolymer product and/or compounded biomass-polymer blend has an oxygen transmission rate and a water vapor transmission rate of at least a two-fold decrease, when compared to the oxygen transmission rate and the water vapor transmission rate of the native polymer.

In an embodiment, the biopolymer product and/or compounded biomass-polymer blend has an oxygen transmission rate and a water vapor transmission rate of at least four times less, or at least three times less than the oxygen transmission rate and the water vapor transmission rate of the native polymer. In another embodiment, the biopolymer product and/or compounded biomass-polymer blend includes at least one lignocellulosic biomass/polymer interface having an interfacial shear strength of from about 0.1 to about 150 MPa, of from about 0.2 to about 120 MPa. In certain embodiments, the biopolymer product and/or compounded biomass-polymer blend has a tensile strength in the range of from about 10 to about 45 MPa, or from about 20 to about 35 MPa, a stress at break of from about 10 to about 45 MPa, or from about 25 to about 35 MPa, an elongation at break of from about 1 to about 5%, or from about 2 to about 3%, and a Young's modulus of from about 1,500 to about 4,000 MPa, or from about 2,600 to about 2,900 MPa.

DESCRIPTION OF THE FIGURES

The drawings illustrate generally, by way of example, but not by way of limitation, various embodiments discussed in the present document.

FIG. 4(a) is the SEM of a PHB-based biopolymer prepared with untreated, dried SCG; FIG. 4(b) is the SEM of a PHB-based biopolymer prepared with dried, substantially lipid-free polyphenol-free SCG; FIG. 4(c) is the SEM of a PHB-based biopolymer prepared with dried, substantially lipid-free polyphenol-free and hemicellulose-free SCG; and FIG. 4(d) is the SEM of a PHB-based biopolymer prepared with dried, substantially lipid-free and hemicellulose-free SCG.

FIG. 7(a) is 0% (w/w) SCG; FIG. 7(b) is 5% (w/w) SCG; FIG. 7(c) is 10% (w/w) SCG; FIG. 7(d) is 15% (w/w) SCG; FIG. 7(e) is 20% (w/w) SCG; FIG. 7(f) is 25% (w/w) SCG; FIG. 7(g) is 30% (w/w) SCG; and FIG. 7(h) is 40% (w/w) SCG.

ABBREVIATIONS

Figure 1:
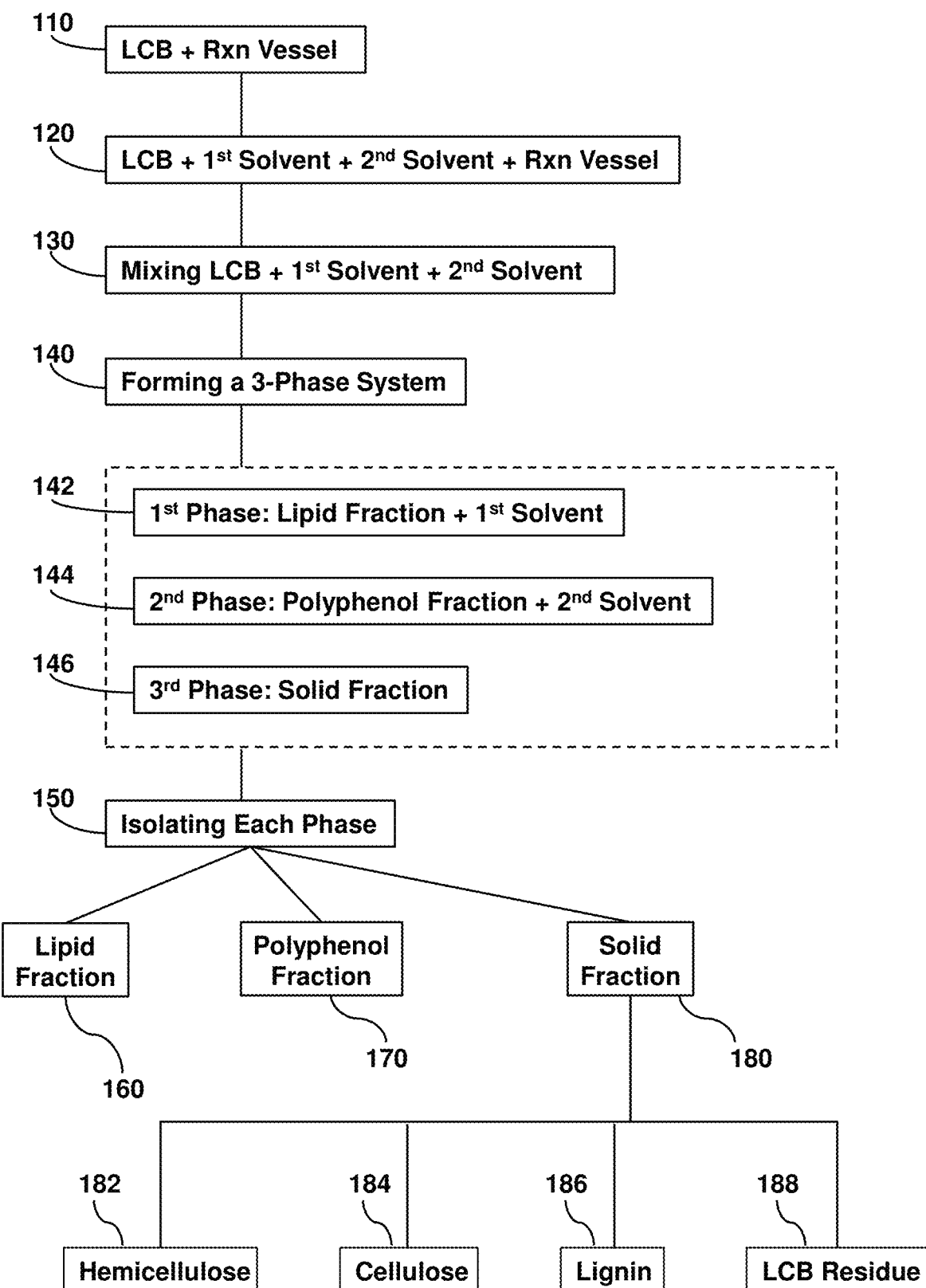
FIG. 1 is a general schematic illustration of a method for extracting organic compounds from lignocellulosic biomass according to embodiments of the disclosure.

For purposes of clarity and as an aid in understanding the disclosure, the following abbreviations are defined below:
DCW—dry cell weight
DM—dry matter
DMA—dynamic mechanical analysis
DMC—dry matter content
DPPH—2,2-diphenyl-1-picrylhydrazyl
GAE—gallic acid equivalents
HDT—heat deflection temperature
LCB—lignocellulosic biomass
OTR—oxygen transmission rate
PBAT—polybutylene adipate
PBS—polybutylene succinate
PCL—polycaprolactone
PDI—polydispersity index
PET—polyethylene terephthalate
PHA—polyhydroxyalkanoate
PHB—polyhydroxybutyrate
PLA—polylactic acid
PP—polypropylene
ppm—parts per million (1 mg/kg)
rpm—rotations per minute SCG—spent coffee grounds
SEM—scanning electron microscope
TPC—total phenolic content
WVTR—water vapor transmission rate

DETAILED DESCRIPTION

As used herein, the terms "a" or "an" are used, as is common in patent documents, to include one or more than one independent of any other instances or usages of "at least one" or "one or more." As used herein, the term "about" refers to an amount that is approximately, nearly, almost, or in the vicinity of being equal to or is equal to a stated amount. As used herein, the term "neat" refers to a polymer in the state as it exits a polymerization reaction chamber when it is an essentially pure polymer without any additives. As used herein, a percentage expressed as % (w/w) means percent by mass, and a percentage expressed as % (v/v) means percent by volume.

As used herein, the term "alkyl," by itself or as part of another substituent, means, unless otherwise stated, a hydrocarbon group that may be linear, cyclic, branched, or a combination thereof having the number of carbon atoms designated (i.e., $C_1$-$C_6$ means one to six carbon atoms). Examples of alkyl groups include methyl, ethyl, n-propyl, isopropyl, n-butyl, t-butyl, isobutyl, sec-butyl, pentyl, isoamyl, hexyl, octyl, nonyl and the like. Alkyl groups may be optionally substituted as defined herein or fully saturated. As used herein, the term "alkylene," by itself or as part of another substituent, means, unless otherwise stated, a saturated aliphatic group derived from a straight or branched chain saturated hydrocarbon attached at two or more positions, such as methylene (—$CH_2$—).

When a group is substituted, the substituents may include, without limitation, one or more substituents independently selected from the following groups or a particular designated set of groups, alone or in combination: lower alkyl, lower alkenyl, lower alkynyl, lower alkanoyl, lower heteroalkyl, lower heterocycloalkyl, lower haloalkyl, lower haloalkenyl, lower haloalkynyl, lower perhaloalkyl, lower perhaloalkoxy, lower cycloalkyl, phenyl, aryl, aryloxy, lower alkoxy, lower haloalkoxy, oxo, lower acyloxy, carbonyl, carboxyl, lower alkylcarbonyl, cyano, hydrogen, halogen, hydroxy, amino, lower alkylamino, arylamino, amido, nitro, thiol, lower alkylthio, arylthio, lower alkylsulfinyl, lower alkylsulfonyl, arylsulfinyl, arylsulfonyl, sulfonate, sulfonic acid, trisubstituted silyl, $N_3$, SH, $SCH_3$, $C(O)CH_3$, pyridinyl, thiophene, furanyl, lower carbamate, and lower urea. Furthermore, substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to, —OR', =O, =NR', =N—OR', —NR'R'', —SR', -halogen, —SiR'R''R''', —OC(O)R', —C(O)R', —$CO_2$R', —CONR'R'', —OC(O)NR'R'', —NR''C(O)R', —NR'—C(O)NR''R''', —NR''C(O)$_2$R', —NR—C(NR'R''R''')=NR'''', —NR—C(NR'R'')=NR', —S(O)R', —S(O)$_2$R', —S(O)$_2$NR'R'', —NRSO$_2$R', —NR'NR''R''', —ONR'R'', —NR'C(O)NR''NR'''R'''', —CN, —$NO_2$, —NR'SO$_2$R'', —NR'C(O)R'', —NR'C(O)—OR'', —NR'OR'', in a number ranging from zero to (2 m'+1), where m' is the total number of carbon atoms in such radical. R, R', R'', R''', and R'''' each preferably independently refer to hydrogen, substituted or unsubstituted heteroalkyl, substituted or unsubstituted cycloalkyl, substituted or unsubstituted heterocycloalkyl, substituted or unsubstituted aryl (e.g., aryl substituted with 1-3 halogens), substituted or unsubstituted heteroaryl, substituted or unsubstituted alkyl, alkoxy, or thioalkoxy groups, or arylalkyl groups. When a compound described herein includes more than one R group, for example, each of the R groups is independently selected as are each R', R'', R', and R'''' group when more than one of these groups is present. When R' and R'' are attached to the same nitrogen atom, they can be combined with the nitrogen atom to form a 4-, 5-, 6-, or 7-membered ring. For example, —NR'R'' includes, but is not limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —$CF_3$ and —$CH_2CF_3$) and acyl (e.g., —$C(O)CH_3$, —$C(O)CF_3$, —$C(O)CH_2OCH_3$) and the like.

FIG. 1 is an exemplary flowchart illustrating a method for extracting organic compounds from lignocellulosic biomass (LCB), including the processes. At 110, the lignocellulosic biomass is added or provided to a reaction vessel, and at 120, the lignocellulosic biomass in the reaction vessel is contacted with a first solvent and a second solvent, the first solvent and the second solvent being immiscible with one another. The first and second solvents are mixed with the lignocellulosic biomass in the reaction vessel at 130 for a period of time and at a mixing speed sufficient to provide a solvent-lignocellulosic biomass mixture. At 140, a three-phase system from the solvent-lignocellulosic biomass mixture mixed at 130 is formed, wherein the three-phase system includes: (i) a first phase 142 including a lipid-rich phase having a lipid fraction and the first solvent; (ii) a second phase 144 including a polyphenol-rich phase with a polyphenol fraction and the second solvent; and (iii) a third phase 146 including a solid fraction having solid lignocellulosic biomass substantially free of the lipid fraction and the polyphenol fraction. The respective phases then are isolated at 150 to provide a lipid fraction 160 by removing the first solvent from the lipid-rich phase, a polyphenol fraction 170 by removing the second solvent from the polyphenol-rich phase, and a solid fraction 180. The solid fraction 180 can include hemicellulose 182, cellulose 184, lignin 186 and LCB residue 188, wherein lignin as used herein denotes a class of polymers including phenol moieties.

In certain embodiments, the disclosure provides a method of extracting organic compounds from lignocellulosic biomass, wherein the extraction may include one or more extraction techniques selected from liquid-liquid extraction, solid-liquid extraction, gas-solid extraction, supercritical fluid extraction, and combinations and mixtures thereof.

In certain embodiments, lignocellulosic biomass as used herein includes edible and non-edible virgin biomass, waste biomass and energy crops. In certain embodiments, lignocellulosic (LCB) contains three main cell wall polymers: cellulose, hemicellulose, and lignin. In one embodiment, LCB may also contain other ingredients such as minerals, proteins, phenolic compounds, lipids, and other extractable substances. In one embodiment, LCB refers to the raw plant material or any residual plant-based material after the raw plant material was used or processed including but not limited to bark, branches, leaves, corn, fibers, giant king grass, Napier grass, elephant grass, giant reed grass, grass clippings from any source including but not limited to wild or human managed pastures and human housing, halophytes (various species), miscanthus, reed canary grass, roots, rusby or Virginia mallow, short rotation coppice of willow and poplar, shrubs, silks, switchgrass, tendrils, trees, vines and combinations or mixtures thereof.

In one embodiment, LCB includes roasted coffee beans (whole beans or ground beans), including but not limited to Arabica Coffee Beans, Robusta Coffee Beans, Bourbon Coffee Beans, Catimor Coffee Beans, Maragogype Coffee Beans, Liberica Coffee Beans, Excelsa Coffee Beans, Caturra Coffee Beans, Harar (Harrar) Artisan Coffee Beans, Geisha Coffee Beans, Pacas Coffee Beans, Ruiru Coffee Beans, Kona Coffee Beans, Maragatura Coffee Beans, Icatu Coffee Beans, Pacamara Coffee Beans, Mundo Novo Coffee Beans, Jackson Coffee Beans, Jamaican Blue Mountain, Mocha Coffee Beans, Java Coffee Beans, Jember Coffee Beans, Kent Coffee Beans, Sagada Coffee Beans, SL-28 Coffee Beans, SL-34 Coffee Beans, Sumatra Coffee Beans, Tanzania Peaberry Coffee Beans, Timor Coffee Beans, Typica Coffee Beans, Villa Sarchi Coffee Beans, Villalobos Coffee Beans and Other Varieties and Hybrids.

In certain embodiments, LCB includes roasted coffee grounds including but not limited to Arabica, Bourbon, Catimor, Catuai, Mocha, Maracatu, Caturra, Geisha, Excelsa, Pache, Robusta, Liberica, Maragogype, Icatu, Pacas, Pacamara, Jackson, Jamaican Blue Mountain, Mundo Novo, Jember, Kent, Kona, Ruiru, SL-28/SL-34, Villa Sarchi, Villalobos and Other Varieties and Hybrids.

In another embodiment LCB includes tea leaves, coffee or tea alternatives including but not limited to roasted or unroasted dandelion root, roasted or unroasted chicory root, yerba mate, rooibos leaves and/or stalks and/or roots, spices, matcha powder, nuts. In some embodiments, LCB includes biomass of any other type including but not limited to parts of the olive plant (for example: stone/seed/leaves), parts of the oil palm (for example: palm kernel cake, empty fruit bunches, the palm kernel shell, and the mesocarp fiber), soybean, rapeseed/canola, jatropha seed, jojoba seed, ulva sp, gracilaria, grateloupia, padina, or Microalgal biomass. In some embodiments, LCB includes the outer coverings including but not limited to the shell and husk of various nuts including but not limited to Coffee bean, Cocoa bean, Cupuaqu shell, Jatropha, Cashew, Bagasse, Sunflower, Agai stone, Sugarcane, Straw, Corn stover, Clover, Saw/paper mill discards, or Switchgrass.

In an embodiment, the coffee grounds may be used or unused. In one embodiment, the coffee grounds may be spent. In certain embodiments, "spent coffee grounds" (SCG) as used herein includes the lignocellulosic biomass resulting from the coffee grounds brewing process. In certain embodiments, SCG as used herein, are roasted coffee bean material whether used, unused or used more than once and whether dry or wet. In certain embodiments SCG is a type of food grade waste formed from coffee beans whether the SCG are ground or whole and before, during or after contact with water of any temperature. In one embodiment, SCG are coffee grounds that have been used at least once, or at least twice, or at least three or more times. In one embodiment, the coffee grounds are roasted and ground into particles.

In certain embodiments, LCB (e.g., SCG) may be ground or milled. In certain embodiments, the grinding and/or milling may increase surface area or reduce the average particle size. In certain embodiments, the LCB (e.g., SCG) may be ground such that the average particle size ranges from 0.1 µm to 20,000 µm. In one embodiment, the average particle size is under 200 µm, under 100 µm, under 10 µm, under 1 µm. In another embodiment the average particle size ranges from 0.1 to 100 µm, 5 to 50 µm, 10 to 25 µm, 200-400 µm, 400-600 µm, 600-800 µm, 800-1000 µm, 1000 to 1200 µm, 1200 µm or larger, 100 to 5000 µm. In some embodiments the average particle size is 230 µm or 270 µm or 320 µm.

The LCB (e.g., SCG) may include up to 10%, up to 20%, up to 30%, or up to 50% non-organic matter as additional material found in the original LCB.

FIG. 1 (110) represents providing the LCB to a reaction vessel. In one embodiment, the reaction vessel is a separatory funnel. In another embodiment, the reaction vessel is a round-bottom flask. In another embodiment, the reaction vessel is an Erlenmeyer flask. In another embodiment, the reaction vessel is a beaker. In another embodiment, the reaction vessel is an industrial scale extraction vessel, preferably equipped with a stirring or agitating mechanism. In another embodiment, the reaction vessel can be selected from a rotary evaporator, an ultrasonic extractor, a microwave extractor, a vertical column extractor, a rotary extractor, a soxhlet extractor, a multi-stage extractor, a packed bed extractor, a continuous flow extractor, a centrifugal extractor, a falling film extractor, a counter current extractor, a batch and/or continuous extractor (each optionally stirred), and combinations thereof. In one embodiment multiple extractors are used.

FIG. 1 (120) represents contacting the LCB with a first solvent and a second solvent in the reaction vessel, the first solvent and the second solvent being immiscible with one another, wherein "contacted" as used herein means any of pouring, injecting, tossing, combining, stirring, mixing, shaking, centrifugation, turning, blending, rotating, rolling, swirling, agitating, rocking or combinations thereof.

In one embodiment, the first solvent is a nonpolar solvent. In one embodiment, the first solvent is a hydrocarbon-based solvent. In another embodiment, the first solvent is a hydrocarbon-based nonpolar solvent having from about 5 to about 20, or from about 5 to about 15, or from about 5 to about 8 carbon atoms. In one embodiment, the first solvent includes a $C_5$-$C_{20}$ nonpolar solvent, a $C_5$-$C_{15}$ nonpolar solvent, or a $C_5$-$C_5$ nonpolar solvent. In another embodiment, the first solvent can be selected from pentane, hexane, heptane, n-octane, iso-octane, or combinations or mixtures thereof. In a preferred embodiment, the first solvent is hexane or heptane. In one embodiment, the first solvent is used for extracting lipids. In one embodiment, the first solvent is used for extracting oil. In one embodiment, the first solvent is used for extracting coffee oil. In certain embodiments, the first solvent is used to extract coffee oil from SCG. In other embodiments, hexane is used to extract coffee oil from SCG.

In another embodiment, the first solvent can be any nonpolar or weakly polar organic solvent that is miscible with hydrocarbon-based solvents, including but not limited to diethyl-ether, ethers, cyclohexane, chlorobenzene, chloroform, dichloromethane, isomers of xylene, toluene, benzene, acetone, isopropanol, 2-methyltetrahydrofuran, diethoxymethane, or combinations or mixtures thereof. In one embodiment the first solvent is a mixture of hexane and isopropanol. In another embodiment the first solvent is either ethanol or methanol. In one embodiment the first solvent is a mixture of a nonpolar and a weakly polar solvent. In another embodiment the first solvent is any solvent having a similar polarity to that of hexane and which is immiscible with the second solvent. In certain embodiments the first solvent is fully or partially miscible with the second solvent.

In another embodiment, the first solvent may be a solvent used in an ionic liquid-mediated extraction of lipids. See, e.g., Kim, Y-H, K., et al., "Ionic liquid-mediated extraction of lipids from algal biomass," *Bioresource Technology*, Vol. 109 (April 2012), pp. 312-315. doi: 10.1016/j.biortech.2011.04.064. For example, the conventional Bligh and Dyer's method can be used to extract lipids using a mixture of [Bmim][CF$_3$SO$_3$] and methanol, where Bmim is 1-butyl-3-methylimidazolium. Other suitable ionic liquids include cyano-methylimidazolium bromide, propyl-methylimidazolium bromide, or mixtures of [Bmim][MeSO$_4$] and a polar organic solvent or [Bmim][MeSO$_4$] and a polar organic solvent, where Bmim is 1-ethyl-3-methylimidazolium. Another suitable ionic liquid may be a hexalkylguanidinium ionic liquid such as [diBTMG]Br, where diBTMG is dibutyl tetramethylguanidine. See also, Ventura, S. P. M., et al., "Ionic-Liquid-Mediated Extraction and Separation Processes for Bioactive Compounds: Past, Present, and Future Trends," *Chem. Rev.*, Vol. 117 (2017), pp. 6984-7052. doi: 10.1021/acs.chemrev.6b00550. See also, Li, F., et al., "Deterpenation of tea tree oil by liquid-liquid extraction with hexalkylguanidinium ionic liquid," *J. Mol. Liq.*, Vol. 339 (2021), pp. 117048-117057. doi: 10.1016/j.molliq.2021.117048.

In one embodiment the amount of the first solvent is determined based on the dry matter content (DMC) of the LCB (e.g., SCG), wherein dry matter as used herein means the amount of dry material in LCB (e.g., SCG) and wherein the dry matter content is measured according to ISO 11465: 1993. In one embodiment, the ratio of the first solvent to the dry matter of LCB (e.g., SCG) is about 1-10:1, about 3-8:1, about 4:1. In a preferred embodiment, the first solvent is hexane and the ratio of the first solvent to the dry matter of SCG is 4:1.

Figure 2:
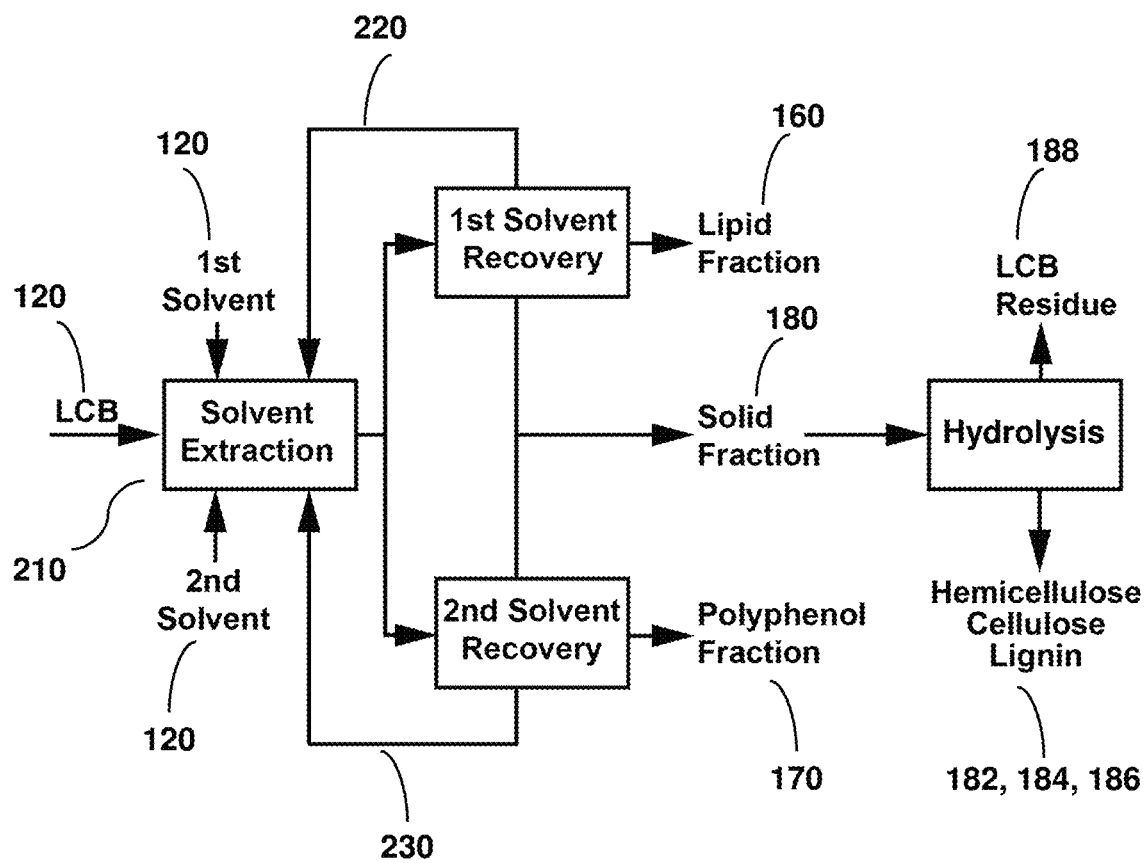
FIG. 2 is a schematic representation of an exemplary method of converting lignocellulosic biomass (LCB) into a lipid fraction, a polyphenol fraction, a portion containing hemicellulose and/or a portion containing cellulose and/or a portion containing lignin and a substantially lipid-free polyphenol-free LCB residue according to some embodiments of the present disclosure.

In one embodiment, the second solvent is a polar or semi-polar solvent. In one embodiment the second solvent is water or a water miscible organic polar solvent or a mixture of thereof. In a preferred embodiment, the second solvent is a C$_1$-C$_{10}$ polar or weakly polar solvent, or a C$_2$-C$_4$ solvent, or acetonitrile, ethanol, methanol, or combinations or mixtures thereof. In one embodiment, the second solvent has a water content of 0-100%. In another embodiment, the second solvent is an aqueous mixture. In one embodiment, the second solvent includes a mixture of a C$_1$-C$_{10}$ organic solvent and water. In a preferred embodiment, the second solvent is 50% (v/v) aqueous acetonitrile. In a preferred embodiment the first solvent and the second solvent are immiscible with each other. In one embodiment, regenerated solvents from previous extractions are used (FIG. 2 at 220 and 230). In one embodiment, the second solvent is used for extracting polyphenols, wherein polyphenols as used herein denotes naturally occurring compounds that are characterized by multiple phenol units. In certain embodiments, polyphenols may be substituted or unsubstituted. In another embodiment, the second solvent is used for extracting polyphenols from SCG.

In one embodiment the amount of the second solvent is determined based on the dry matter content of the LCB (e.g., SCG). In one embodiment, the ratio of the second solvent to the dry matter content of LCB (e.g., SCG) is about 1-10:1, about 3-7:1, or about 5:1. In a preferred embodiment, the second solvent is 50% (v/v) aqueous acetonitrile and the ratio of the second solvent to the dry matter of SCG is 5:1. In certain embodiments, the solvents and the LCB are added to the reaction vessel in any order.

FIG. 1 (130) represents mixing the first solvent and the second solvent with the lignocellulosic biomass in the reaction vessel sufficient to provide a solvent-lignocellulosic biomass mixture, wherein "mixing" denotes any speed of agitating, pouring, stirring, mixing, tossing, shaking, centrifugation, combining, turning, blending, rotating, rolling, swirling, rocking or combinations thereof. In certain embodiments, the expression "sufficient to provide" as used herein means any method and time of mixing wherein a solvent-LCB mixture is created.

In one embodiment, the solvent-lignocellulosic biomass mixture is uniformly distributed throughout the reaction vessel. In another embodiment, the solvent-lignocellulosic biomass mixture is not uniformly distributed throughout the reaction vessel and forms aggregates or pockets or regions of the first solvent and/or the second solvent and/or the lignocellulosic biomass.

FIG. 1 (140) shows processing that forms a three-phase system from the solvent-lignocellulosic biomass mixture, wherein "forming a three-phase system" as used herein means any manner of creating a three-portion mixture, wherein each portion is physically distinct from the other two and mechanically separable from each other. In some embodiments, the three-phases system 140 includes a first phase 142, a second phase 144, and a third phase 146.

In certain embodiments, the first phase 142 includes a lipid-rich phase. In some embodiments the lipid-rich phase includes a lipid fraction 160 and the first solvent. In certain embodiments, "lipid-rich phase" as used herein means a portion of the solvent-lignocellulosic biomass three-phase mixture, wherein a portion of, a majority of, or substantially all of the lipids present in the three-phase mixture have experienced mass transfer into the first solvent. In certain embodiments Soxhlet extraction may be used to extract the lipid-fraction from LCB. In certain embodiments other methods of liquid-solid extraction can be used. In certain embodiments, liquid-liquid-solid extraction can be used. Other embodiments include extraction techniques selected from microwave-assisted extraction, ultrasound-assisted extraction, enzyme-assisted extraction, pressurized liquid extraction, steam distillation, percolation, supercritical fluid extraction, and mixtures and combinations thereof.

In certain embodiments, the "lipid fraction" 160 as used herein denotes a group of organic compounds that are esters of fatty acids including but not limited to simple lipids, fats and waxes, or closely related substances including but not limited to compound lipids. In certain embodiments compound lipids are phospholipids. In certain embodiments, the lipid fraction 160 compounds are insoluble in water but soluble in alcohol and other organic solvents. In certain embodiments, the lipid fraction 160 of spent coffee grounds may include but is not limited to any lipid and/or fatty acid including but not limited to linoleic acid, palmitic acid, oleic acid, tocopherols, caffeine, kahweol (and its derivatives/isomers), pregnenolone (and its derivatives/isomers), alpha and beta-tocopherol, campesterol, stigmasterol, gamma-sitosterol, and plant sterols and mixtures and/or combinations thereof. The lipid fraction may contain polyphenolic acid, flavonoids, stilbenes, lignans and other polyphenolic compounds and mixtures and/or combinations thereof.

In certain embodiments, the second phase 144 includes a polyphenol-rich phase. In some embodiments the polyphenol-rich phase includes a polyphenol fraction and the second solvent. In certain embodiments, "polyphenol-rich phase" as used herein means a portion of the solvent-lignocellulosic biomass three-phase mixture, wherein a portion of, a majority of, or substantially all of the polyphenolic compounds present in the three-phase mixture have experienced mass transfer into the second solvent. In certain embodiments Soxhlet extraction can be used to extract the polyphenol-fraction from LCB. In certain embodiments other methods of liquid-solid extraction are used. In certain embodiments, supercritical fluid extraction may be used. In certain embodiments, the "polyphenol fraction" 170 as used herein refers to a fraction that is essentially or substantially polyphenolic compounds or polyphenols. In certain embodiments, polyphenols are naturally occurring compounds that are characterized by multiple phenol units. In certain embodiments, polyphenols may be substituted or unsubstituted. In certain embodiments, the polyphenol fraction is moderately, substantially, or fully soluble in polar solvents such as methanol and ethyl acetate. In certain embodiments, the polyphenol fraction of spent coffee grounds includes but is not limited to polyphenolic acid, flavonoids, stilbenes, lignans, other polyphenolic compounds, catechol, 3,4-dihydroxybenzaldehyde, hydrocaffeic acid, 4-O-caffeoylquinic acid, 4-O-feruloylquinic acid, 6,8-dihydroxy-3-methylisocoumarin, chlorogenic acid, 4,5-dicaffeoylquinic acid, caffeic acid, ferulic acid and any stereoisomers thereof and mixtures and/or combinations thereof.

In certain embodiments, the third phase 146 includes a solid fraction having solid lignocellulosic biomass substantially free of the lipid-rich phase 142, substantially free of the polyphenol-rich phase 144, substantially free of the first solvent and substantially free of the second solvent. "Substantially free" denotes containing less than 10% by weight of the respective phases and solvents, or less than 7%, or less than 5%, or less than 3%, or less than 1%, or less than 0.5%, or less than 0.1% by weight of the respective phases and solvents.

FIG. 1 (150) represents certain embodiments of the method including isolating the first phase and removing the first solvent from the lipid-rich phase to produce the lipid fraction; isolating the second phase and removing the second solvent from the polyphenol-rich phase to produce the polyphenol fraction; and isolating the third phase including remaining solid matter. In certain embodiments, the two solvents and the solid matter are isolated in any order and using any conventional technique familiar to one of skill in the art.

In certain embodiments, the third phase 146 is substantially free of the lipid fraction 160, the polyphenol fraction 170 and the two solvents. In certain embodiments the third phase is isolated first from the three-phase system, thereby obtaining 1) the third phase 146 including solid matter and 2) a two-phase system containing the lipid-rich phase 142 and the polyphenol-rich phase 144.

In certain embodiments, separation of the third phase 146 may be carried out by filtration, centrifugation, decanting, membrane separation such as microfiltration, ultrafiltration, or nanofiltration, or other conventional separation techniques. In certain embodiments, separation of the solid phase 146 is carried out by filtration. In certain embodiments, filtration is performed using a filter. In certain embodiments the filter pore size is in a range of from about 1 μm to about 500 μm, about 2 μm to about 100 μm, about 10 μm to about 100 μm, about 15 μm to about 20 μm. In certain embodiments rotary drum filters, nutsche filters, pressure nutsche filters, agitated nutsche filters, plate and frame filters, vacuum filters, centrifugal filters, bag filters, filter presses and ultrafiltration systems may be used.

In certain embodiments, the third phase 146 is separated first, and then the separation of the liquids of the remaining two-phase system is carried out in any order using density-based separation techniques, such as draining the lower layer in a separatory funnel or a similar industrial scale device. In certain embodiments, centrifugal extractors, decanters, coalescers, dissolved air flotation, liquid-liquid extraction columns, liquid-liquid extraction columns with packed beds, gravity settlers, membrane separators, cyclone separators, and pulsed column extractors may be used to separate the liquids of the remaining two-phase system. In other embodiments, the two liquid phases are separated using any conventional industrial scale technique familiar to one of ordinary skill in the art.

In certain embodiments, each phase of the remaining two-phase system (the lipid-rich phase 142 and the polyphenol-rich phase 144) is separated from the other, providing the respective lipid-rich phase 142 and the polyphenol-rich phase 144. In certain embodiments, the first phase 142 is removed from the second phase 144. In other embodiments, the second phase 144 is removed from the first phase 142. In other embodiments, the liquids are initially separated from the three-phase system leaving behind the third phase 146 including the solid fraction having solid lignocellulosic biomass substantially free of the lipid fraction and the polyphenol fraction. In other embodiments, each of the three-phases can be removed from the other two phases in any order using any conventional technique familiar to familiar to one of ordinary skill in the art.

In certain embodiments, the first solvent is separated and recovered using any conventional means and then reused in the method (see, e.g., FIG. 2 at 220). In certain embodiments, the first solvent is evaporated using any conventional means from the first phase 142 to recover the first solvent 220. In certain embodiments a rotary evaporator may be used. In certain embodiments, the first solvent is reused in the method for extracting organic chemicals from the LCB by condensing the first solvent and recycling to the mixing process (FIG. 2 at 210).

In certain embodiments, the second solvent is separated and recovered using any conventional means and then reused in the method (see, e.g., FIG. 2 at 230). In certain embodiments, the second solvent is evaporated using any conventional means from the second phase 144 to recover the second solvent (230). In certain embodiments a rotary evaporator may be used. In certain embodiments, the second solvent is reused in the method for extracting organic chemicals from LCB in the same or similar manner as the first solvent is recycled and reused (FIG. 2 at 230).

FIG. 1 (140) represents processing that forms a three-phase system, wherein forming a 3-phase system includes allowing the solvent-lignocellulosic biomass mixture to rest for a period of time sufficient to produce the three-phase system. In certain embodiments, "rest" as used herein includes but is not limited to stopping any mixing motion. In other embodiments, "rest" as used herein includes but is not limited to allowing any force such as gravity or centrifugation of any speed to separate a mixed three-phase system into three separate phases which may be separated from each other by any conventional means. In certain embodiments, the period of time the solvent-lignocellulosic biomass mixture rests is from about 1 minute to about 4 days, about 5 minutes to about 2 day, about 10 minutes to about 24 hours, about 20 minutes to about 12 hours, about 30 minutes to about 6 hours, about 45 minutes to about 4 hours, about 60 minutes to about 120 minutes, about 2 minutes to about 60 minutes, about 30 minutes to about 60 minutes, about 10 minutes to about 30 minutes. In certain embodiments, "sufficient to produce" as used herein means any amount of time necessary to form the three-phase system.

Certain embodiments of the method include hydrolyzing the third phase solid fraction 180 to produce a lignocellulosic biomass (LCB) residue 188. In certain embodiments, the method includes hydrolyzing the remaining solids using a process selected from an acid hydrolysis, an alkaline hydrolysis, or an enzymatic hydrolysis or a combination of any two or a combination of all three, where each hydrolysis of the combination may be completed in any order. In certain embodiments, the method includes hydrolyzing the remaining solids which includes but is not limited to removing hemicellulose 182, cellulose 184, lignin 186, monosaccharides, and/or polysaccharides.

In certain embodiments, the method includes hydrolyzing the substantially lipid-free polyphenol-free remaining solid fraction 180, wherein hydrolyzing as used herein refers to the common definition as well understood by a person of skill in the art. In certain embodiments, the method includes extracting hemicellulose 182 from the substantially lipid-free polyphenol-free solid fraction 180 by hydrolysis. In certain embodiments, the method includes extracting cellulose 184 from the substantially lipid-free polyphenol-free remaining solid fraction 180 by hydrolysis. In certain embodiments, the method includes extracting lignin 186 from the substantially lipid-free polyphenol-free remaining solid fraction 180 by hydrolysis. In certain embodiments, the method includes extracting hemicellulose 182 and/or lignin 186 and/or cellulose 184 from the substantially lipid-free polyphenol-free remaining solid fraction 180 proceeding in any order.

In certain embodiments, the extraction of the hemicellulose 182 from the remaining solid fraction 180 may be carried out by chemical hydrolysis. In certain embodiments, the extraction of the hemicellulose 182 can be carried out by dilute acid hydrolysis. In certain embodiments, the extraction of the hemicellulose 182 may be performed in the presence of at least one dilute acid. In certain embodiments, the dilute acid is an inorganic acid. In certain embodiments, the dilute inorganic acid is hydrochloric acid and/or nitric acid and/or phosphoric acid and/or sulfuric acid. In certain embodiments, the dilute acid is an organic acid. In certain embodiments, the dilute organic acid is acetic and/or formic and/or propionic acid. In certain embodiments, the dilute acid is a combination of acids. In certain embodiments, the dilute acid can be present in an amount ranging from about 0.01 to about 50% (v/v), about 0.05 to about 30% (v/v), about 0.1 to about 20% (v/v) about 0.3 to about 10% (v/v), about 0.01 to about 8% (v/v), about 0.3 to about 28% (v/v) based on the total volume.

In certain embodiments, the extraction of the hemicellulose 182 can be carried out by the addition of $H_2SO_4$ ranging from about 0.01% to about 50%, about 0.05% to about 40%, 0.1% to about 30%, about 0.5% to about 20%, about 1% to about 10%, about 1% to about 5% (w/w). In certain embodiments, the extraction of the hemicellulose 182 may be carried out by the addition of at least a 2% (w/w) $H_2SO_4$ solution. In certain embodiments, the extraction of the hemicellulose 182 can be carried out by the addition of about 2% (w/w) $H_2SO_4$ solution. In certain embodiments, the extraction of the hemicellulose 182 may be carried out by the addition of less than a 2% (w/w) $H_2SO_4$ solution. In certain embodiments, the ratio of sulfuric acid solution to dry matter LCB (e.g., SCG) may be in a range of about 1-30:1, about 1-20:1, about 1-10:1, about 1-6:1. In certain embodiments, the ratio of sulfuric acid solution to dry matter LCB (e.g., SCG) is 5.5:1. In certain embodiments, the extraction of the hemicellulose 182 is carried out by the addition of 2% (w/w) $H_2SO_4$ solution, wherein the ratio of sulfuric acid solution to dry matter LCB (e.g., SCG) is 5.5:1.

In certain embodiments, the extraction of the hemicellulose 182 by dilute acid hydrolysis can produce reducing sugars. In certain embodiments, the total reducing sugar content may be from about 20 g/L to about 100 g/L, about 30 g/L to about 80 g/L, about 20 g/L to about 60 g/L, about 50 g/L to about 60 g/L, at least 50 g/L, at least 60 g/L. In certain embodiments, the total reducing sugar content can be at least 55 g/L from 30 g dry matter, at least 54 g/L from 30 g dry matter, at least 56 g/L from 30 g dry matter. In certain embodiments, the reducing sugars may include but are not limited to pentose sugars such as xylose and arabinose; hexose sugars such as glucose, galactose, and mannose. In certain embodiments, the reducing sugars may include but are not limited to fructose, glyceraldehydes, lactose, arabinose, maltose, glucuronic acid, L-rhamnose and L-fucose.

In certain embodiments, the extraction of the lignin fraction may be carried out by chemical hydrolysis. In certain embodiments, the extraction of the lignin fraction can be carried out by alkaline hydrolysis. In certain embodiments, the extraction of the lignin fraction may be carried out by NaOH and/or KOH and/or $Ca(OH)_2$ and/or $NH_4OH$ extraction. In certain embodiments, the extraction of the lignin fraction may be carried out using a combination of alkaline solutions. In certain embodiments, the NaOH and/or KOH and/or $Ca(OH)_2$ and/or $NH_4OH$ concentration ranges from about 0.01 N to about 10 N, about 0.05 N to about 8 N, about 0.1 N to about 6 N, about 0.5 N to about 4 N, about 0.5 N to about 2.5 N. In certain embodiments, the ratio of NaOH and/or KOH and/or $Ca(OH)_2$ and/or $NH_4OH$ to dry matter LCB (e.g., SCG) may be in a range of about 0.1-20:1, about 0.5-10:1, about 1-5:1. In certain embodiments, the alkali is NaOH. In certain embodiments, the NaOH is 0.5 N. In certain embodiments, the ratio of alkali to dry matter LCB (e.g., SCG) is 2:1. In certain embodiments, the reaction occurs at 50° C. In certain embodiments, the reaction proceeds for 6 hours. In certain embodiments, the reaction produces 520±0.01 µg/mL of reducing sugars. In certain embodiments, 0.5 N NaOH is added in a 2:1 ratio to SCG at 50° C. for 6 h, producing 520±0.01 g/mL of reducing sugar.

In certain embodiments, the extraction of the lignin 186 may be carried out before and/or after extracting the hemicellulose 182. In certain embodiments, the extraction of the lignin 186 using alkaline hydrolysis can be carried out before and/or after extracting the hemicellulose 182 using acid hydrolysis. In certain embodiments, the alkaline hydrolysis removes substantially all of the lignin 186 so that the resulting product is substantially free of lignin. In certain embodiments, extracting the lignin 186 improves the efficiency of the enzymatic hydrolysis. In certain embodiments, the extraction of the lignin 186 and the hemicellulose 182 is carried out in any order.

In certain embodiments, the extraction of the cellulose 184 can be carried out by enzymatic hydrolysis. In certain embodiments, the extraction of the cellulose 184 may be carried out after extracting the hemicellulose 182 and the lignin 186. In certain embodiments, substantially all of the lignin 186 can be removed before the enzymatic hydrolysis. In certain embodiments, the extraction of the lignin fraction and the hemicellulose 182 and the cellulose 184 may be carried out in any order. In certain embodiments, a cellulase enzyme blend is used for enzymatic hydrolysis. In other embodiments, the cellulase enzyme blend includes Cellic® Ctec3 or Cellic® Ctec2, commercially available from Novozymes® A/S, Bagsvaerd, Denmark. In certain embodiments, the enzymatic hydrolysis proceeds for more than about 1 minute, or about 5 minutes, or about 10 minutes, or about 20 minutes, or about 30 minutes, or about 33 minutes, or about 45 minutes, or about 1 hour, or about 10 or about 20 or about 24, or about 36, or about 48, or about 60, or about 72, or about 90 hours.

In certain embodiments, the substantially lipid-free, polyphenol-free remaining solid fraction 180 may contain about 20% (w/w) to about 80% (w/w), about 30% (w/w) to about 60% (w/w), about 40% (w/w) to about 55% (w/w) of polysaccharides, including but not limited to hemicellulose 182 and cellulose 184. In certain embodiments, sugars including but not limited to mannose, galactose, arabinose, and glucose are extracted from the hemicellulose and cellulose.

In certain embodiments, the polyphenol content remaining after the acid hydrolysis and/or the alkaline hydrolysis and/or the enzymatic hydrolysis can be from about 0.1 to about 20 mg/mL, about 0.5 to about 10 mg/mL, about 1.0 to about 10 mg/mL, about 1.5 to about 4 mg/mL, about 1.5 to about 3.5 mg/mL, about 2.0 to about 3.5 mg/mL gallic acid equivalents (GAE). In certain embodiments, the polyphenol content remaining after the acid hydrolysis and/or the alkaline hydrolysis and/or the enzymatic hydrolysis is from about 2.26 to about 3.38 mg/mL GAE. In certain embodiments, after hydrolysis, the resulting solution of simple sugars is separated from the LCB residue 188 producing a filtrate. In certain embodiments, the resulting solution of simple sugars is separated from the LCB residue 188 by filtration. In other embodiments, the filtrate is neutralized producing a neutralized filtrate. In certain embodiments, the filtrate is neutralized by the addition of alkali. In certain embodiments, the filtrate is neutralized by the addition of NaOH and/or $Ca(OH)_2$ and/or KOH and/or $NH_4OH$. In other embodiments, the neutralized filtrate is concentrated producing a concentrated neutralized filtrate. In certain embodiments, the neutralized filtrate is concentrated, including but not limited to using membrane separation technologies, evaporation, reverse osmosis. In further embodiments, a detoxification step is carried out on any one of the obtained filtrates, i.e., on the filtrate, on the neutralized filtrate or on the concentrated neutralized filtrate. In certain embodiments, detoxification is performed using activated carbon adsorption. In other embodiments, detoxification is performed using evaporation and/or membrane filtration and/or, ion-exchange resin, and/or alternative adsorbents, and/or combinations and/or mixtures thereof.

In certain embodiments, the lignocellulosic biomass (LCB) residue 188 is the solid matter remaining after extracting desired components from the solid fraction 180, which may include but are not limited to hemicellulose 182, cellulose 184, lignin 186, and reducing sugars. In certain embodiments the LCB residue 188 is substantially free of lipids and/or polyphenols and/or hemicellulose 182 and/or cellulose 184, as well as the solvents used. In certain embodiments the LCB residue includes a lipid content below 20%, 15%, 10%, 5%. In certain embodiments, the LCB residue includes a lipid content below 4%. In certain embodiments the LCB residue includes a polyphenol content below 20%, 15%, 10%, 5%. In certain embodiments, the LCB residue includes a polyphenol content below 4.5%. In certain embodiments, the LCB residue includes a lignin content ranging from about 0% to about 100%, about 5% to about 90%, about 10% to about 85%, about 20% to about 80%, about 30% to about 80%. In certain embodiments, the LCB residue includes a hemicellulose content ranging from about 0% to about 60%, about 1% to about 50%, about 2% to about 40%, about 5% to about 35%, about 10% to about 30%. In certain embodiments, the LCB residue includes a cellulose content ranging from about 0% to about 60%, about 1% to about 50%, about 2% to about 40%, about 5% to about 35%, about 10% to about 30%. In certain embodiments, the LCB residue includes a lipid content of less than 4%, a polyphenol content below 4.5%, a lignin content ranging from about 30% to about 80%, a hemicellulose content ranging from about 10% to about 30%, and a cellulose content ranging from about 10% to about 30%.

In certain embodiments of the method the lignocellulosic biomass (LCB) starting material may have a moisture content of from about 2% to about 90%. In certain embodiments, the LCB is wet. In certain embodiments, the LCB is SCG. In certain embodiments, the SCG is wet.

In certain embodiments, the LCB may have a moisture content of at least 10% (w/w), or from about 30% (w/w) to about 80% (w/w), or from about 40% (w/w) to about 70% (w/w). In certain embodiments, the LCB has a dry matter content of less than about 50%, or less than about 40%, or less than about 30%, as measured in accordance with ISO 11465:1993.

In certain embodiments, the LCB is dried LCB. In certain embodiments, the LCB has a moisture content of below about 12% (w/w), below about 10% (w/w), below about 7% (w/w), below about 5% (w/w), below about 2% (w/w), below about 1% (w/w), or below about 0.5% (w/w).

In certain embodiments of the method, the first solvent can be an organic nonpolar solvent. In certain embodiments, the first solvent is a hydrocarbon-based solvent having from 5 to about 20 carbon atoms, or from 5-15 carbon atoms, or from 5-8 carbon atoms. In other embodiments, the first solvent may be hexane, heptane, a hexane/isopropanol mixture, ethanol, methanol, and/or any hydrocarbon solvent mixture. In certain embodiments, the first solvent is any other solvent that has a similar polarity to that of hexane and is immiscible with the second solvent. In certain embodiments, the first solvent is hexane. In other embodiments the first solvent is partially, moderately, or fully miscible with the second solvent.

In certain embodiments, the first solvent can be used for extracting oils and/or lipids and/or fats and/or waxes from LCB. In certain embodiments, the first solvent is used to extract coffee oil from SCG. In certain embodiments, the amount of the first solvent is determined based on the dry matter content of the LCB (e.g., SCG). In certain embodiments, the ratio of the first solvent to the dry matter of LCB (e.g., SCG) is about 2-10:1, or about 3-8:1, or about 4:1. In certain embodiments, the first solvent is hexane and the ratio of the first solvent to the dry matter of LCB (e.g., SCG) is 4:1.

In certain embodiments of the method, the second solvent may include but is not limited to an organic polar solvent, water, and mixtures thereof. In certain embodiments, the second solvent can be an organic polar solvent, such as a $C_1$-$C_{10}$ polar or semi-polar solvent, or a $C_2$-$C_4$ solvent. In certain embodiments, the second solvent is water. In certain embodiments, the second solvent is acetonitrile, ethanol, methanol, water, and/or mixtures or combinations thereof. In certain embodiments, the water content of the second solvent is from about 0% to about 20%, about 20% to about 50%, about 50% to about 80%, about 80% to about 100%, about 0 to about 100%, about 20% to about 80%. In certain embodiments, the water content of the second solvent is greater than 50%. In certain embodiments, the water content of the second solvent is less than 50%. In certain embodiments, the water content of the second solvent is less than 50%. In certain embodiments, the water content of the second solvent is less than 50%. In certain embodiments, the water content of the second solvent is less than 50%.

In certain embodiments, the amount of the second solvent is determined based on the dry matter content of the LCB (e.g., SCG). In certain embodiments, the ratio of the second solvent to the dry matter of LCB (e.g., SCG) is about 1-10:1, or about 3-7:1, or about 5:1. In certain embodiments, the second solvent is 50% (v/v) aqueous acetonitrile and the ratio of the second solvent to the dry matter of LCB (e.g., SCG) is 5:1.

In an embodiment, the second solvent is a mixture of an organic solvent and water (e.g., an azeotrope). In an embodiment, the second solvent may be aqueous 50% (v/v) acetonitrile. In certain embodiments where the second solvent is an azeotrope, distillation techniques including but not limited to azeotropic distillation, extractive distillation, pressure swing distillation may be used to separate the organic solvent and the water. In certain embodiments, pervaporation or pervaporative separation may be used to separate liquid mixtures by partial evaporation through non-porous or porous membranes. In other embodiments, a hybrid pervaporation distillation system, which represents a combination of distillation and membrane-based pervaporation techniques, is used to separate the organic solvent and the water. In other embodiments, reverse osmosis is used to separate the organic solvent and the water. In other embodiments, nanofiltration is used to separate the organic solvent and the water. In other embodiments, a rotary evaporator is used to separate the organic solvent and the water.

In other embodiments, azeotropes and/or aqueous mixtures can be separated by treatment with an inorganic salt. In certain embodiments, the salting-out technique will produce two phases: a water phase and a water-miscible organic solvent phase. In certain embodiments the salts include potassium, sodium, and/or ammonium salts. In other embodiments, mass separating agents such as sugars, ionic liquids, and/or polyols are used. In certain embodiments the mass separating sugars include but are not limited to glucose, xylose, arabinose, fructose, sucrose, maltose, or mixtures thereof. In certain embodiments the mass separating polyols include but are not limited to ethylene glycol, propylene glycol, glycerol, sorbitol, erythritol, xylitol, mannitol, maltitol or mixtures thereof. In certain embodiments the mass separating inorganic salts include but are not limited to NaCl, KCl, $Na_2SO_4$, $(NH_4)_2SO_4$, $MgSO_4$, and $CaCl_2$). In certain embodiments, biphasic ionic liquids include but are not limited to 1-butyl-3-methylimidazolium hexafluorophosphate ([BMIM][PF6]), 1-butyl-3-methylimidazolium tetrafluoroborate ([BMIM][BF4]), 1-butyl-3-methylimidazolium chloride ([BMIM][Cl]), 1-octyl-3-methylimidazolium hexafluorophosphate ([OMIM][PF6]), 1-octyl-3-methylimidazolium chloride ([OMIM][Cl]), 1-ethyl-3-methylimidazolium ethylsulfate ([EMIM][EtSO4]), 1-hexyl-3-methylimidazolium bis(trifluoromethylsulfonyl)imide ([HMIM][Tf2N]), 1-dodecyl-3-methylimidazolium chloride ([C12MIM][Cl]).

In certain embodiments, the lower phase contains the aqueous solution of the mass separating agent, and the upper phase contains the polyphenol-rich organic solvent solution. In certain embodiments, the two layers can then be separated by methods including but not limited to decantation, using a separating funnel, and/or other conventional separation techniques. In certain embodiments, centrifugation can be used to separate the two phases. In other embodiments, the mixtures separate by gravity. In certain embodiments, the organic solvent can be removed from the polyphenol-rich phase by, for example, evaporation to produce the polyphenol-fraction. In certain embodiments, the remaining solvent can be recycled and reused. In other embodiments, the remaining aqueous phase is recovered and/or reused.

In certain embodiments of the method, the mixing 130 provides phase contact between the lignocellulosic biomass and the first and second solvents. In certain embodiments, the mixing includes stirring from about 10 to about 10,000 rpm at a temperature of from about 20° C. to about 300° C. for a period of time within the range of from about 1 minute to about 120 hours. In one embodiment, magnetic stirrers may be used. In another embodiment, overhead stirrers can be used. In another embodiment, a centrifuge may be used. Other embodiments include mixing carried out using one or more devices selected from ultrasonic homogenizers, high-shear mixers, agitated tanks with suitable impellers or agitators, stirred tank reactors with suitable impellers, ultrasonic reactors, reactors with suitable mixing capabilities, continuous flow reactors, where suitable impellers include but are not limited to paddle impellers, hydrofoil impellers, high-speed dispersers, jet mixers, fluidized bed agitators, anchor impellers with scrapers, counter-rotating impellers, disc turbine impellers, Rushton turbines, Cowles impellers, gate impellers, pitched blade turbines, Intermig impellers, ribbon impellers and mixtures and/or combinations thereof. In certain embodiments, reaction vessels include but are not limited to stirred tank reactors, fluidized bed reactors, agitated filter reactors, agitated tank reactors, multi-stage agitated reactors, oscillatory baffled reactors, ultrasonic reactors, continuous flow reactors.

In one embodiment, the mixing may be performed at a speed within the range of from about 10 rpm to about 10,000 rpm, or from about 150 to about 1000 rpm, or from about 200 to about 500 rpm. In another embodiment, the mixing is performed at about 150 rpm or 200 rpm.

In certain embodiments, the mixing can be carried out for a period of time within the range of from about 1 minute to about 120 hours. In other embodiments, the mixing may be performed for a period of time within the range of from about 5 minutes to about 100 hours, or about 10 minutes to about 50 hours, or about 10 minutes to about 48 hours, or about 10 minutes to about 36 hours, or about 30 minutes to about 24 hours, or about 5 minutes to about 12 hours, or about 2 minutes to about 10 hours, or about 2 minutes to about 5 hours, or about 2 minutes to about 2 hours. In other embodiments, the mixing is performed for at least 1, 3, 5, 10, 15, 30, 60, or 120 minutes.

In certain embodiments, the mixing can be carried out at a temperature within the range of from about 20° C. to the boiling point of the solvents. In certain embodiments, the mixing may be performed at a temperature of at least 20° C., or 30° C., or 40° C., or 50° C., or 60° C., or 70° C., or higher. In certain embodiments, the mixing is performed at a temperature within the range of from about 20° C. to about 70° C., or from about 30° C. to about 70° C., or from about 40° C. to about 60° C., or from 45° C. to about 55° C.

In certain embodiments of the method, the LCB is coffee beans, wherein coffee beans as used herein have been defined previously. In certain embodiments of the method, the first solvent is hexane and the second solvent is 50% (v/v) aqueous acetonitrile. In certain embodiments of the method, the extracting proceeds in one reaction vessel in one step. In certain embodiments, the extracting proceeds in more than one reaction vessel. In certain embodiments, the extracting proceeds in two or more vessels. In certain embodiments, the reaction proceeds in more than one vessel in more than one step.

Figure 3:
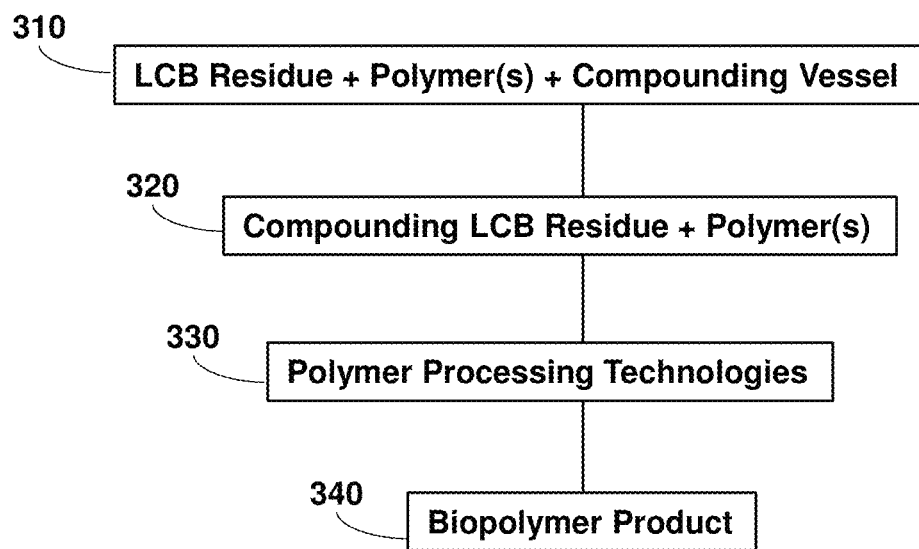
FIG. 3 is a general schematic illustration of a method of compounding a lignocellulosic biomass residue with a polymer to produce a biopolymer product and/or compounded biomass-polymer blend according to embodiments of the disclosure.

FIG. 3 is a flowchart illustrating a method of compounding a lignocellulosic biomass residue with a polymer to produce a biopolymer product and/or compounded biomass-polymer blend, including (a) providing the lignocellulosic biomass residue and the polymer in a compounding vessel 310 wherein the lignocellulosic biomass residue is substantially free of the lipid fraction 160, the polyphenol fraction 170, hemicellulose 182, cellulose 184, and lignin 186; (b)

compounding the lignocellulosic biomass residue with the polymer 320 to produce a compounded biomass-polymer blend; and optionally (c) using polymer processing technologies 330 on the compounded biomass-polymer blend to produce the biopolymer product 340 that may be used for a specific application. Those skilled in the art will appreciate that the compounded biomass-polymer blend of (b) may be used as a final product to be provided to end users for further processing, or it may be further processed to produce a biopolymer product useful for a specific application.

FIG. 3 (310) represents providing the lignocellulosic biomass (LCB) residue and the polymer to a compounding vessel wherein the lignocellulosic biomass residue is substantially free of the lipid fraction 160, the polyphenol fraction 170, hemicellulose 182, cellulose 184, and lignin 186. In certain embodiments the LCB residue and the polymer are added to the compounding vessel in any order. In certain embodiments, compounding vessels include but are not limited to internal mixers such as Banbury mixers, twin-screw extruders, and high-speed mixers.

In certain embodiments, any polymer or number of polymers may be used in the method of compounding with the lignocellulosic biomass residue. For example, the polymer may include but is not limited to natural and synthetic polymers selected from: polyacrylic acids; polyalcohols; polyalkalenes; polyalkalene oxides; poly(alkyl)acrylates; poly(alkylene) vinyl alcohols; polyamides; polycarbonates; polydepsipeptides; polydihydropyrans; poly(ester anhydrides); polyesteramides; polyesters; polyethers; polyhydroxyacids; polymeric carbohydrates; polyorthoesters; polypeptides; polyphosphates; polypyrrolidones; polysaccharide derivatives; polysaccharides; polyurethanes (PU); polyvinylalcohols (PVA); copolymers thereof; terpolymers thereof; mixtures thereof and combinations thereof.

In certain embodiments, the polymer includes, but is not limited to: polylactic acid (PLA); polylactides; poly-b-malic acid (PMLA); polyesters or copolymers of succinic acid; polyesters of oxalic acid; polyalkyl-2-cyanoacrylates; poly-p-dioxanone (PDS); poly-d-valerolactone-poly-ε-caprolactone, poly(ε-caprolactone-DL-lactide) copolymers; polyhydroxyalkanoates (PHAs), such as polyhydroxybutyrates (PHB), PHB/b-hydroxyvalerate copolymers (PHB/HV), poly-b-hydroxypropionate (PHPA); poly-b-alkanoic acids; unsymmetrically 3,6-substituted poly-1,4-dioxane-2,5-diones; all copolymers of PLA, such as lactide/trimethylene carbonate copolymers, lactide/tetramethylglycolide copolymers, lactide/d-valerolactone copolymers, lactide/ε-caprolactone copolymers, L-lactide/DL-lactide copolymers, glycolide/L-lactide copolymers (PGA/PLLA), polylactide-coglycolide; glycolide/trimethylene carbonate copolymers (PGA/TMC), PLA/polyethylene oxide copolymers; all terpolymers of PLA such as lactide/glycolide/trimethylene carbonate terpolymers, lactide/glycolide/F-caprolactone terpolymers; polypeptides; proteins; sugars; cellulose and cellulose derivatives; collagen; monosaccharides; disaccharides; polysaccharides; hyaluronic acid; chitosan; chitin; fibrin; starches; methylmethacrylate-N-vinyl pyrrolidone copolymers; PLA/polyethylene oxide copolymers; poly(α-hydroxyacids); poly(β-hydroxyacids); poly(γ-hydroxyacids); polybutylene terephthalate (PBT); polyethylenes such as polyethylene terephthalate (PET); Ethylene vinyl acetate (EVA); Polyacrylic acid (PAA); Poly(methyl methacrylate); Ethylene Vinyl Alcohol (EVOH); P3HB4HB; P3HBHHx; mixtures and combinations of specific polymers and mixtures and combinations of specific polymers with polymer classes; and copolymers and terpolymers of specific polymers and mixtures of specific polymers with polymer classes.

FIG. 3 (320) represents compounding the lignocellulosic biomass residue with the polymer to produce a compounded biomass-polymer blend. In certain embodiments, "compounding" as used herein denotes a method of mixing and/or blending polymers and/or non-polymers and/or any additional materials to achieve the desired characteristics and properties. Compounding includes but is not limited to combining, blending, kneading, mixing, melting, stirring, turning, reinforcing, intermixing, incorporating, extruding and/or combinations thereof. Compounding may be performed using co-kneaders and/or extruders including for example twin-screw extruders, either co-rotating or counter-rotating design, and/or single-screw extruders. In certain embodiments, compounding the LCB residue with the polymer produces a compounded biomass-polymer blend. Mixtures of any of the aforementioned polymers, copolymers, terpolymers and mixtures and combinations thereof may be used in the process of compounding.

In certain embodiments, before compounding, the LCB residue can undergo a grinding process with the purpose of reducing its particle size. This can improve the distribution of the filler in the polymer matrix leading to better homogeneity and may also have a positive impact on the barrier properties. In certain embodiments, the grinding technologies may include but are not limited to ball mills, hammer mills, roller mills, knife mills, vibratory mills, disc mills, coffee grinders, cutting mills, attrition mills, cyrogenic grinding, colloid mills, impact mills, cone mills and combinations thereof. In certain embodiments, the LCB residue may be ground such that the average particle size ranges from about 0.1 μm to about 1500 μm. In one embodiment, the average particle size is under 200 μm, or under 100 μm, or under 10 μm, or under 1 μm. In another embodiment the average particle size ranges from about 0.1 to about 100 m, or from about 5 to about 50 μm, or from about 10 to about 25 μm, or from about 50 to about 200 μm, or from about 200 to about 400 μm, or from about 400 to about 600 μm, or from about 600 to about 800 μm, or from about 800 to about 1000 μm, or from about 1000 to about 1200 m, or about 1200 μm or larger, or from about 50 to about 1500 μm. In some embodiments the average particle size is about 150 μm or about 250 μm or about 350 μm or about 450 μm.

FIG. 3 (330) represents the optional use of polymer processing technologies on the compounded biomass-polymer blend to produce a biopolymer product 340 that can be used for a specific application. In certain embodiments, the compounded biomass-polymer blend may optionally be further processed using various polymer processing technologies. In certain embodiments, "polymer processing technologies" as used herein may include but are not limited to extrusion, injection molding, pultrusion, fiber drawing, film blowing, compression molding, thermoforming, extrusion, resin transfer molding, blow molding, compression molding, transfer molding, reaction injection molding, injection blow molding, rotational molding, vacuum forming, calendering, casting, coating, laminating, foaming, fiber spinning, 3d printing and/or additive manufacturing, and mixtures and combinations thereof. In certain embodiments, the polymer processing technologies used on the compounded biomass-polymer blend produce a biopolymer product 340 useful for a specific application.

In certain embodiments, the term "biopolymer" as used herein denotes materials derived from or partially including biomass and/or living and/or formerly living matter. In certain embodiments, a biopolymer as used herein, may include any number of additives and/or polymers. In an embodiment, the term "biopolymer" includes a compounded biomass-polymer blend, and the term "biopolymer product" denotes a compounded biomass-polymer blend that has been further processed for a specific end use application. The expression "compounded biomass-polymer blend" denotes the biopolymer before being processed with one or more polymer processing techniques used to make a polymeric end product, and the expression "biopolymer product" denotes a compounded biomass-polymer blend that has been subjected to a one or more polymer processing techniques. In certain embodiments, a biopolymer is biodegradable and/or compostable. In certain embodiments, a biopolymer is not biodegradable and/or compostable. In certain embodiments, a biopolymer may be naturally occurring. In other embodiments, a biopolymer may not be naturally occurring and/or may be synthetic. In other embodiments, a biopolymer may be a polymer composite or a biocomposite. In certain embodiments, the polymer composite or biocomposite includes biologically based agents. In certain embodiments, the polymer composite or biocomposite includes purely synthetic materials. In certain embodiments, the polymer composite or biocomposite includes a mixture of synthetic and biologically based materials. In certain embodiments, the polymer composite or biocomposite includes additives, fillers, plasticizers, and any other suitable material either natural or synthetically based.

In certain embodiments, the lignocellulosic biomass residue may have a moisture content within the range of from about 0% to about 15%. In certain embodiments, the LCB residue includes a moisture content of below about 15%, or below about 10%, or below about 8%, or below about 6%, or below about 5%, or below about 4%, or below about 3%, or below about 2%, or below about 1%. In certain embodiments, the LCB residue has a moisture content within the range of from about 0% to about 8%, or from about 0% to about 6%, or from about 0% to about 4%, or from about 0% to about 2%, or from about 0% to about 1%. In certain embodiments the LCB residue moisture content is about 0%. In certain embodiments, the moisture content of PLA polymers is maintained below about 450 ppm, or below about 400 ppm, or below about 350 ppm, or below about 300 ppm, or below about 250 ppm, or below about 200 ppm, or below about 150 ppm, or below about 100 ppm, or below about 50 ppm prior to the use of polymer processing technologies. In certain embodiments, the moisture content of polyhydroxyalkanoate polymers can be maintained below about 600 ppm, or below about 550 ppm, or below about 500 ppm, or below about 450 ppm, or below about 400 ppm, or below about 350 ppm, or below about 300 ppm before polymer processing technologies are used.

In certain embodiments, the LCB residue may be present in the biopolymer in an amount within the range of from about 1% to about 99%, or from about 2% to about 90%, or from about 5% to about 85%, or from about 10% to about 80%, or from about 15% to about 75%, or from about 20% to about 70%, or from about 25% to about 65%, or from about 30% to about 60%, or from about 35% to about 55%, or from about 40% to about 50%. In certain embodiments, the biopolymer includes about 45% LCB residue. In certain embodiments, the biopolymer includes less than about 100%, or less than about 80%, or less than about 60%, or less than about 40%, or less than about 20%, or less than about 10%, or less than about 5% LCB residue. In certain embodiments, the biopolymer includes from about 5% to about 40% by weight of the LCB residue, or from about 5% to about 20% by weight of the LCB residue.

In certain embodiments, the biopolymer product and/or compounded biomass-polymer blend may further comprise at least one additive selected from a group consisting of: acid scavengers: activated carbon; additives; adhesives; adsorbents; agglomerants; antiaging agents; antifogging agents; anti-hydrolysis agents; antioxidants; antistatic agents; aromatic chemicals; binders; biocides; brighteners; carbohydrates; catalysts; chain extenders; clays; coatings; colorants; complexing agents; coupling agents; crosslinking agents; crystallization accelerators; crystallization retarders; cyclodextrins; delustering agents; dyes; elastomers; electromagnetic radiation absorbers; electromagnetic radiation stabilizers; emulsifiers; enzymes; expanders; extenders; fibers; fillers; films; flame retardants; flocculants; fluorescent brightening agents; foams; fuels; glide agents; glues; gums; impact modifiers; indicators; lubricants; minerals; monomer or other starting substances; natural biopolymers: nonbiodegradable components; nonbiological components; nucleating agents; odor masking agents; oligomers; organic and inorganic pigments; paints; pelletizing additives; plasticizers; plastics; polymer production aids: polymerization aids; polysaccharides; powders; processing aids; proteins; release agents; resins; rubbers; salts; sand; sequestrants; slip agents; stabilizers; starches; surfactants; tackifying resins; thermal stabilizers: toxin binders; viscosity stabilizers; waxes; mixtures thereof and combinations thereof.

In certain embodiments, the biopolymer product and/or compounded biomass-polymer blend may include a variety of additional ingredients including non-biobased and non-biodegradable components. In certain embodiments, any added ingredient can be compostable and/or biodegradable. In certain embodiments, the biopolymer includes any additives known to a person skilled in the art. In certain embodiments, the biopolymer product and/or compounded biomass-polymer blend includes materials customarily added in plastics technology such as those selected from: stabilizers; nucleating agents; glide and release agents such as stearates, including calcium stearate; plasticizers such as, for example, citric esters, such as tributyl acetylcitrate; glyceric esters such as triacetylglycerol or ethylene glycol derivatives; surfactants such as polysorbates, palmitates or laurates; waxes such as, for example, erucamide, stearamide or behenamide, beeswax or beeswax esters; antistatic agents; electromagnetic radiation absorbers, for example UV and/or visible light absorbers; electromagnetic radiation stabilizers, such as UV and/or visible light stabilizers; antifoggants; or dyes.

In an embodiment, the biopolymer product and/or compounded biomass-polymer blend may include one or more impact modifier(s) without compromising desirable properties. In certain embodiments, any suitable impact modifier may be used, including core shell acrylic elastomers. In certain embodiments, the impact modifier may be, for example, Sukano® im633 (Sukano®), PARALOID™ BPM-520 (DowDuPont™). In certain embodiments, the amount of the one or more impact modifier(s) ranges from about 0.01% (w/w) to about 50% (w/w), or about 0.05% (w/w) to about 40% (w/w), or 0.1% (w/w) to about 20% (w/w), based on the weight of the biopolymer.

In another embodiment, the biopolymer product and/or compounded biomass-polymer blend may include one or more plasticizer(s) without compromising desirable properties. In certain embodiments, any suitable one or more plasticizer(s) may be used, including any known natural or synthetic compound including but not limited to 1,2,6- hexanetriol, 1,4-butanediol, acetyltriethyl citrate, acetyltri-n-butyl citrate, acetyltri-n-hexylcitrate, butyryltri-n-hexyl citrate, cellulose methyl ether, citrate esters such as trimethyl citrate, citric acid, diacetin, diethylene glycol, diglycerol, dipropylene glycol, epoxidized oils, ethylene glycol, glycerol, glycerol diacetate or triacetate, glycerol monoacetate, lactic acid (monomer and oligomers), maltitol, mannitol, natural rubbers, oils, oleic acid, other known plasticizers, polyethylene glycol, polyethylene glycol fatty acid esters, polyethylene-propylene glycol, polypropylene glycol, polyvinyl alcohol, propylene glycol, sodium alginate, sodium cellulose glycolate, sodium diethylsuccinic, sorbitan, sorbitol, tributyl citrate, triethanolamine, triethyl citrate, triethylene glycol, trioctyl citrate, urea, mixtures and combinations thereof, aid any similar substances. In certain embodiments, the amount of the one or more plasticizer(s) ranges from about 0.0001% (w/w) to about 70% (w/w), or about 0.0005% (w/w) to about 60% (w/w), or about 0.001% (w/w) to about 50% (w/w), or about 0.005% (w/w) to about 40% (w/w), or about 0.01% (w/w) to about 20% (w/w), based on the weight of the biopolymer.

In certain embodiments, the biopolymer product and/or compounded biomass-polymer blend may include one or more flame retardant(s) without compromising desirable properties. In certain embodiments, any suitable one or more flame retardant(s) may be used, including Exolit AP 422 (Clariant®), pentaerythritol phosphate (PEPA), melamine phosphate (MP) and polyhedral oligomeric silsesquioxanes (POSS). In certain embodiments, the amount of the one or more flame retardant(s) ranges from about 0.001% (w/w) to about 50% (w/w), or about 0.005% (w/w) to about 40% (w/w), or about 0.01% (w/w) to about 20% (w/w), based on the weight of the biopolymer.

In another embodiment, the biopolymer product and/or compounded biomass-polymer blend may contain one or more antioxidant(s) without compromising desirable properties. In certain embodiments, any suitable one or more antioxidant(s) may be used, including Irganox series (BASF®), Irgafos series (BASF®), Hostanox® series (Clariant®). In certain embodiments, the amount of the one or more antioxidant(s) ranges from about 0.001% (w/w) to about 50% (w/w), or about 0.005% (w/w) to about 40% (w/w), or about 0.01% (w/w) to about 20% (w/w), based on the weight of the biopolymer.

In certain embodiments, the biopolymer product and/or compounded biomass-polymer blend can include one or more electromagnetic radiation stabilizer(s) without compromising desirable properties. In certain embodiments, the electromagnetic radiation stabilizers include UV and visible light stabilizers. In certain embodiments, any suitable one or more electromagnetic radiation stabilizer(s) may be used, including Hostavin® series (Clariant®), Cesa™ block series (Clamant®), OnCap™ Bio series (PolyOne™). In certain embodiments, the amount of the one or more electromagnetic radiation stabilizer(s) ranges from about 0.01% (w/w) to about 50% (w/w), or about 0.05% (w/w) to about 40% (w/w), or about 0.1% (w/w) to about 20% (w/w), based on the weight of the biopolymer. In an embodiment, the amount of the one or more electromagnetic radiation stabilizer(s) ranges from about 0.1% (w/w) to about 10% (w/w).

In certain embodiments, the biopolymer product and/or compounded biomass-polymer blend can include one or more colorant(s) without compromising desirable properties. In certain embodiments, any suitable one or more colorant(s) may be used, including Renol™ nature series (Clariant®), OnColor™ Bio series (PolyOne™). In certain embodiments, the amount of the one or more colorant(s) ranges from about 0.001% (w/w) to about 50% (w/w), or about 0.005% (w/w) to about 40% (w/w), or about 0.01% (w/w) to about 20% (w/w), based on the weight of the biopolymer.

In another embodiment, the biopolymer product and/or compounded biomass-polymer blend can include one or more anti-hydrolysis agent(s) without compromising desirable properties. In certain embodiments, any suitable one or more anti-hydrolysis agent(s) may be used, including Carbodilite® series (Nisshinbo® chemical), Stabaxol® series (Lanxess®). In certain embodiments, the amount of the one or more anti-hydrolysis agent(s) ranges from about 0.001% (w/w) to about 50% (w/w), or about 0.005% (w/w) to about 40% (w/w), or about 0.01% (w/w) to about 20% (w/w), based on the weight of the biopolymer.

In some embodiments, the biopolymer product and/or compounded biomass-polymer blend may include one or more filler(s) without compromising desirable properties. In certain embodiments, any suitable one or more filler(s) may include, but is not limited to clays, silica, mica, wollastonite, calcium hydroxide, calcium carbonate, sodium carbonate, magnesium carbonate, barium sulfate, magnesium sulfate, kaolin, calcium oxide, magnesium oxide, aluminum hydroxide, talc, titanium dioxide, cellulose fibers, chitin, chitosan powders, organosilicon powders, nylon powders, polyester powders, polypropylene powders, starches, combinations, and mixtures thereof. In certain embodiments, the amount of the one or more filler(s) ranges from about 0.001% (w/w) to about 80% (w/w), or about 0.005% (w/w) to about 70% (w/w), or about 0.01% (w/w) to about 60% (w/w), based on the weight of the biopolymer.

In certain embodiments, other optional components of the biopolymer product and/or compounded biomass-polymer blend may include, but are not limited to gum arabic, bentonite, salts, slip agents, crystallization accelerators or retarders, odor masking agents, crosslinking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, chitin, chitosan, and combinations and mixtures thereof. In an embodiment, the biopolymer may include one or more additional components selected from: acid scavengers; activated carbon; additives; adhesives; adsorbents; agglomerants; antiaging agents; antifogging agents; anti-hydrolysis agents; antioxidants; antistatic agents; aromatic chemicals; binders; biocides; brighteners; carbohydrates; catalysts; chain extenders; clays; coatings; colorants; complexing agents; coupling agents; crosslinking agents; crystallization accelerators; crystallization retarders; cyclodextrins; delustering agents; dyes; elastomers; electromagnetic radiation absorbers; electromagnetic radiation stabilizers; emulsifiers; enzymes; expanders; extenders; fibers; fillers; films; flame retardants; flocculants; fluorescent brightening agents; foams; fuels; glide agents; glues; gums; impact modifiers; indicators; lubricants; minerals; monomer or other starting substances; natural biopolymers; nonbiodegradable components; nonbiological components; nucleating agents; odor masking agents; oligomers; organic and inorganic pigments; paints; pelletizing additives; plasticizers; plastics; polymer production aids; polymerization aids; polysaccharides; powders; processing aids; proteins; release agents; resins; rubbers; salts; sand; sequestrants; slip agents; stabilizers; starches; surfactants; tackifying resins; thermal stabilizers; toxin binders; viscosity stabilizers; waxes; mixtures thereof and combinations thereof.

An embodiment includes a biopolymer product and/or compounded biomass-polymer blend having an oxygen transmission rate and a water vapor transmission rate of at least a two-fold decrease relative to the polymer. In certain embodiments, the biopolymer has an oxygen transmission rate (OTR) of at least a 1.5-fold, or 2-fold, or 2.5-fold, or 3-fold, or 3.5-fold, or 4-fold decrease, when compared to the OTR of the polymer used to form the biopolymer product and/or compounded biomass-polymer blend. In one embodiment, the biopolymer has a water vapor transmission rate (WVTR) of at least a 1.5-fold, or 2-fold, or 2.5-fold, or 3-fold, or 3.5-fold, or 4-fold decrease, when compared to the WVTR of the polymer used to form the biopolymer product and/or compounded biomass-polymer blend. In certain embodiments, the biopolymer has an OTR of at least a 1.5-fold, or 2-fold, or 2.5-fold, or 3-fold, or 3.5-fold, or 4-fold decrease, and the biopolymer has a WVTR of at least a 1.5-fold, or 2-fold, or 2.5-fold, or 3-fold, or 3.5-fold, or 4-fold decrease, when compared to the OTR and WVTR of the neat polymer used to prepare the biopolymer product and/or compounded biomass-polymer blend.

In an embodiment, the biopolymer product and/or compounded biomass-polymer blend includes at least one lignocellulosic biomass/polymer interface having an interfacial shear strength of from about 0.01 to about 300 MPa, or from about 0.05 to about 250 MPa, or from about 0.1 to about 200 MPa, or from about 0.15 to about 150 MPa, or from about 0.2 to about 120 MPa. In certain embodiments, the biopolymer product and/or compounded biomass-polymer blend includes more than 1, 2, 5, 10, 20, 50, 100, 1000 lignocellulosic biomass/polymer interfaces having an interfacial shear strength of from about 0.2 to about 120 MPa.

The embodiments have been described with reference to specifically preferred characteristics, and with reference to specific drawings. Those skilled in the art will know and understand that the various embodiments described herein are not mutually exclusive and can and most often likely will be combined with other embodiments. Those skilled in the art also will appreciate that the invention(s) disclosed herein is not limited to the specifically preferred embodiments.

EXAMPLES

The following examples are merely illustrative of the disclosure and should not be considered limiting the scope of the disclosure in any way, as these examples and other equivalents thereof will become apparent to those skilled in the art in light of the present disclosure and the accompanying claims. All percentages used in the entire application are percent weight by weight (w/w) unless otherwise noted.

Example 1

Determining Dry Matter (DM) Content of SCG

Moisture content of coffee grounds was determined based on standard ISO 11465:1993 (Soil quality—Determination of dry matter and water content on a mass basis —Gravimetric method). An analytical balance was used to determine the accurate mass of empty sample containers. The sample containers were then tared, and 2.0 grams of wet coffee grounds were measured into each. Afterwards, the sample containers were placed into a thermoblock and heated to 105° C. (±1° C.) to evaporate the water. The samples were dried until a constant weight was obtained. The containers were then closed and allowed to cool to room temperature. The accurate masses of the dried sample and sample container were then measured. The difference in mass of SCG before and after the drying process gives the water/dry mass content of SCG samples.

The dry matter content (DMC) of SCG was 30 to 40% on average. However, the DMC of coffee grounds may vary depending on, for example the coffee brewing method, if used, the water-to-coffee ratio, coffee bean origin and roast level, grind size, brewing time, filter type, pre-infusion or blooming, particle size distribution, storage conditions, air moisture content, humidity level, temperature, and the like. Thus, the dry matter content of SCG can be more or less than the values measured herein.

Example 2

Single Vessel Extraction of Coffee Oil and Polyphenols from Wet SCG

A sample of wet coffee grounds (*Coffea arabica* and/or *Coffea Robusta* and/or combinations or mixtures thereof) was divided into two portions. One portion was used to determine the DMC using the methods described in Example 1. A DMC of 30-40% was obtained. The remaining portion of wet coffee grounds were placed in an extraction apparatus equipped with an overhead stirrer. Two immiscible solvents, n-hexane and aqueous acetonitrile (50% v/v) were added to the system in a ratio of solvent to DMC of the solids. The solvent-to-solid ratio was 4:1 (v/w) for hexane and 5:1 (v/w) for aqueous acetonitrile (50% v/v). In some experiments, solvents recaptured from previous extractions were used. The 1 L flask was placed in a thermostatic water bath at 50° C. for 6 h and the mixture was stirred at 200 rpm. After the extraction, the solid residual SCG were removed from the three-phase system by filtration, using filter paper with a pore size of 15-20 μm. The two-phase filtrate was then further separated in a separatory funnel, where the lower phase contained a polyphenol fraction extracted in acetonitrile-water and the upper phase contained the coffee oil fraction extracted in n-hexane.

Example 3

Single Vessel Extraction of Coffee Oil and Polyphenols from Dry SCG

Collected wet spent coffee grounds (*Coffea Arabica*) were dried at 75° C. for 6 hours with a 0.5 m/s air velocity in an oven dryer. After the drying process, the moisture content of SCG decreased below 7%. The dried SCG were placed in a round-bottom flask equipped with a DLAB OS20-S overhead stirrer (MediLab Tech). The round-bottom flask was then placed in a water bath. Two immiscible solvents were added to the system in relation to the dry matter content of SCG, i.e., the solvent-to-solid ratio was 4:1 (v/w) in the case of hexane, and 5:1 (v/w) in the case of aqueous acetonitrile (50% v/v). The flask was placed in a thermostatic bath at 50° C. for 6 h and the mixture was stirred at 200 rpm. After the extraction, the solid residual SCG were removed from the three-phase system by filtration, using filter paper with a pore size of 15-20 μm. The two-phase filtrate was then further separated in a separatory funnel, where the lower phase contained a polyphenol fraction extracted in acetonitrile-water and the upper phase contained the coffee oil fraction extracted in hexane.

Example 4

Coffee Oil Production

After liquid-liquid separation, the resulting mixture of hexane and coffee oil was separated in a rotary evaporator ($T_{bath}$=35° C., 150 rpm rotational speed ($V_r$), $p_{end}$=100 mbar). The recovered hexane was recycled for further extractions. The average yield of coffee oil was 11-14% of the total weight of the SCG starting material, for both the wet and dried SCG starting material. This method provides up to 93% recovery since the oil content of the SCG starting material varied between 10-15%. The product consists predominantly of di- and triglycerides, and its free fatty acid content was below 5% based on GC-MS analysis.

The coffee oil was diluted 200× with n-hexane, then a 10 mL aliquot of the resulting diluted solution was measured into a vial. A saponification reagent was prepared from 9:1 (v/v) mixture of methanol and 2 mol/dm$^3$ NaOH solution. 6 mL of the saponification reagent was added to the diluted coffee oil. The two-phase reaction mixture was vigorously stirred by means of magnetic stirrer, while the reaction temperature was held at 60° C. (using a water bath) for 30 minutes. The sample was then cooled to room temperature and subsequently 10 mL of ultrapure/reverse osmosis/distilled water was added to the sample. To ensure the extraction of methyl-esters into the non-polar (n-hexane) phase, the sample was vortexed for 5 minutes. To achieve faster phase separation, the sample was centrifuged for 2 minutes at 2000 rpm. Finally, the supernatant n-hexane layer was separated and dried with anhydrous $Na_2SO_4$. The sample was then ready to directly inject into the GC-MS instrument. After the saponification of the extracted coffee oil, even-numbered saturated and unsaturated C14-C24 fatty acid methyl esters were identified by GC-MS analysis. Most relevant contaminants of coffee oil are phytosterols (e.g., stigmasterol) and the kahweol (diterpenoid).

Example 5

Polyphenol Fraction Production

Salting-out assisted liquid-liquid extraction was used to separate the water-miscible organic solvent phase (acetonitrile) from the aqueous phase. For efficient separation, 10-13 g of $(NH_4)_2SO_4$ salt was added to 35 mL of acetonitrile-water mixture (50:50 v/v). After vigorous shaking of the mixture for 5-10 minutes, phase separation was accomplished with 10 minutes of centrifugation at a $V_r$ of 6000 rpm. The upper phase (acetonitrile) was transferred to a round bottom flask with ground glass joint. Subsequently, the acetonitrile was evaporated at 35° C. ($T_{bath}$), 150 rpm ($V_r$), and 75 mbar ($p_{end}$). The average yield of the polyphenol mixture was 2.0-4.0%. The yield of the polyphenol mixture depended on the moisture content of the starting material, i.e., wet or dry SCG. The average yield of dry SCG was usually less than that of wet SCG.

The extracted polyphenol fraction had good solubility in polar solvents (e.g., methanol, ethyl acetate), while its solubility in glycerol was 10-25 mg/mL. The product had high antioxidant activity (determined with DPPH assay) and total phenolic content (TPC, determined by Folin-Ciocalteau assay). The average TPC of the polyphenolic fraction was 12.05 mg/g dry SCG. The concentration of total phenolic compounds was expressed in mg gallic acid equivalents (GAE) per gram of dried extract. According to the results of the GC-MS analysis, the following components are mostly responsible for the antioxidant activity of the product and its total phenolic concentration: feruloylquinic acid (isomers), caffeoylquinic acid (isomers) and chlorogenic acid. Trace amounts of maltol, vanillin, 3,4-dihydroxybenzaldehyde (and isomers), 2,5-dihydroxyacetophenone (and isomers), 3,4-dihydroxycinnamic acid (and isomers), 6,8-dihydroxy-3-methylisocoumarin and caffeic acid can also be identified in the product.

Example 6

PHA Production from Coffee Oil

The inoculum of the selected strain (*Cupriavidus necator* H16 or *Cupriavidus* sp. or *Bacillus megaterium*) was prepared by inoculating a single colony in a 500 mL Erlenmeyer flask containing 125 mL of Lysogeny broth (LB). The culture incubated at 30° C. with shaking at 200 rpm for 24 h.

The production of PHA from SCG oil was performed under aerobic conditions in a minimal medium (MM) supplemented with a trace solution. The pH of the final culture medium was adjusted to 7.0 before bacterial inoculation. The cell pellet was washed with sterile 0.85% (w/v) NaCl. A 10% (v/v) of cell suspension was used as inoculum. The content of the initial coffee oil (carbon source) in the reaction mixture was 30 g/L. In order to ensure the best accumulation process and carbon-nitrogen (C:N) ratio, fed-batch fermentation was used. Fed-batch fermentation was carried out at 30° C. for 72 hours at 150 rpm in a 2 L Erlenmeyer flask containing 500 mL of optimized medium. Thus, additional SCG oil was added during the fermentation with a value of 30 g/L. The system and the medium were sterilized in an autoclave at 121° C. and 1 bar for 20 minutes, cooled, and then inoculated with a 10% (v/v) inoculum. For optimal PHA production, the pH of the medium must be maintained using a pH control system at pH 7.0 by the addition of acid or base, but this is not possible manually in an Erlenmeyer flask. Synthesis of poly-[3-hydroxybutyrate] (PHB) by *Cupriavidus necator* H16 in fed-batch flask culture resulted in a biomass yield of 5.7±0.5 g/L (based on dry matter) and 35.0±0.5% of dry cell weight (DCW) of PHB.

Example 7

Dilute Acid Hydrolysis of Residual SCG after the Extraction of Coffee Oil and Polyphenols For the hydrolysis of hemicellulose from the remaining SCG (after the extraction of coffee oil and polyphenols), 2% $H_2SO_4$ solution was added to the SCG and homogenized. The ratio of sulfuric acid solution to SCG (based on dry matter) was 5.5:1. Hydrolysis was performed in an autoclave at 121° C. and 1 bar for 33 minutes. The remaining solid matter was separated from the liquid phase by filtration using filter paper with a pore size of 10-12 µm. The weight of the filtrate (hydrolysate) was about 51% of the weight of the initial reaction mixture. The filtrate contained reducing sugars in a concentration of 55-60 g/L, determined using the dinitrosalicylic acid (DNS) method. After the reaction, the mixture was neutralized using $Ca(OH)_2$ until a pH of 7.0 was obtained.

Example 8

Enzymatic Hydrolysis of Substantially Lipid-Free, Polyphenol-Free, Dilute Acid Hydrolysate Residual SCG for the Production of Fermentable Sugars A tenfold diluted enzyme stock solution (4 g of Cellic® CTec3 multienzyme cocktail, 36 g of buffer) was prepared in acetate buffer (0.1 M, pH=5.0). Enzymatic hydrolysis was performed in an acetate buffer (pH=5.0) containing 20% treated SCG dry matter, where the amount of enzyme was 0.06 g enzyme/g dry matter weight. The reaction was carried out at 50° C. for 72 hours at 150 rpm. During the experiment, 2 mL samples were taken from the reaction mixture after 24, 48 and 72 hours. The samples were centrifuged for 5 minutes at 9000 rpm, then the supernatant was prepared for HPLC analysis (in a 5-fold dilution). After 72 hours, the entire reaction volume was centrifuged for 5 min at 9000 rpm, then the supernatant was further analyzed by HPLC (in a 5-fold dilution). Post-acidification of the supernatants was also performed for the quantitative determination of glucose oligomers and/or monomers. For this purpose, 5 mL of 8% sulfuric acid solution was added to 5 mL of supernatant, then autoclaved at 120° C., 1 bar, for 20 minutes. After the treatment, the cooled samples were prepared for HPLC analysis in a 5-fold dilution. The HPLC measurement was performed with a Shimazu® RID-10A refractive index detector and a BIORAD® Aminex® HPX-87H column.

During the enzymatic hydrolysis, the glucose concentration increased continuously until the end of the hydrolysis but at a slower rate after 24 hours. The glucose concentration obtained was 41 g/L. At the end of the enzymatic hydrolysis (72 hours), a small amount of glucose oligomers and/or monomers can also be found in the supernatant. Their quantity after post-acidification was determined as 6 g/L. Thus, including the amount of oligomers and monomers in the solution, a total glucose yield of 87% was achieved. Furthermore, the supernatant contained xylose/galactose/mannose components (15 g/L) in addition to glucose, so the total sugar content was even higher at 56 g/L.

Example 9

Preparation of SCG-Filled PLA and PHA Biopolymers

The following matrix materials were used in the following examples: Ingeo™ 2003D polylactic acid grade was obtained from NatureWorks© LLC, Minnetonka, MN, USA (4.3 mol % D-lactide content, $\rho=1.24$ g/cm$^3$, $M_W=180$ Kda, $M_n=100$ Kda, PDI=1.80). This PLA grade has a melting temperature ($T_m$) of 151° C. The degree of crystallinity was 28.4% and the melt flow index was 2.9 g/10 min (2.16 kg, 190° C.). ENMAT™ Y3000P poly(3-hydroxybutyrate) (PHB) grade ($\rho=1.25$ g/cm$^3$, $M_W=280$ kDa) was Obtained from TianAn Biologic Material Co. Ltd., Ningbo, China. This PHB grade has a melting temperature ($T_m$) of 167° C. The degree of crystallinity was 71.9% and the melt flow index was 46.17 g/10 min (CEAST 7027.000, 2.16 kg, 190° C.).

Compounding

Spent coffee grounds that underwent different pretreatments (A-D below, where A, B, and D are comparative pretreatments) were compounded with the PHB granules using a Labtech™ Scientific LTE 26-44 modular corotating twin-screw extruder (Labtech™ Engineering Co., Samutprakarn, Thailand) at 180° C. The screw rotational speed was 60 rpm. Before compounding, the PHB matrix and the SCG (A-D) were dried at 80° C. in an Arburg Thermolift dry air dryer for 4 hours. PHB granules were compounded with SCG (A-D) at different loading levels: 0% (i.e., 0% SCG+100% PHB), 5% (i.e., 5% SCG+95% PHB), 10% (i.e., 10% SCG+90% PHB), 15% (i.e., 15% SCG+85% PHB), 20% (i.e., 20% SCG+80% PHB), 25% (i.e., 25% SCG+75% PHB), 30% (i.e., 30% SCG+70% PHB), 40% (i.e., 40% SCG+60% PHB). During compounding, the PHB matrix and the SCG (A-D) were starve-fed into the extruder as a dry mixture. The compound was cooled down by air cooling and granulated by Labtech™ LZ-120/VS pelletizer.

Pretreatment Codes

A: Untreated, dried SCG.

B: Dried SCG residue prepared by subjecting SCG to extraction with two immiscible solvents (hexane and aqueous acetonitrile), resulting in substantially lipid-free polyphenol-free SCG.

C: Dried SCG residue prepared by subjecting SCG to extraction according to the embodiments with two immiscible solvents (hexane and aqueous acetonitrile) and then subjected to dilute acid hydrolysis, resulting in substantially lipid-free polyphenol-free and hemicellulose-free SCG.

D: Dried SCG residue prepared by subjecting SCG to extraction with hexane and then subjected to dilute acid hydrolysis resulting in substantially lipid-free hemicellulose-free SCG.

Injection Molding

Before injection molding, the compounds were dried at 80° C. in an Arburg Thermolift dry air dryer for 4 hours. The injection molded dumbbell-shaped tensile specimens (ISO 527-2/1A type) and the plate samples (80 mm×80 mm×2 mm) were manufactured with an Arburg Allrounder 270 S 400-170 injection molding machine. The injection rate was 40 cm$^3$/s, holding pressure was 300 bar, holding time was 5.2 s, residual cooling time was 30 s, and melt temperatures were increased from 175° C. to 190° C. with 5° C. steps (from rear to front zone), while the mold temperature was set at 60° C.

Example 10

Preparation of SCG—Filled PLA (PLA:SCG) Biopolymers

Compounding

PLA granules were compounded with 20% "C"-SCG (SCG pretreated in accordance with pretreatment "C" of Example 9) with Labtech™ Scientific LTE 26-44 modular corotating twin-screw extruder (Labtech™ Engineering Co., Samutprakarn, Thailand) at 200° C. The screw rotational speed was 60 rpm. Before compounding, PLA was dried at 105° C. in an Arburg Thermolift dry air dryer for 4 hours. SCG that have undergone type "C" pretreatment were dried in a Yamato® DKN600 hot air-drying oven at 150° C. for 4 hours. During compounding, the PLA and the coffee grounds were starve-fed into the extruder as a dry mixture. The compound was cooled down by air cooling and granulated by Labtech™ LZ-120/VS pelletizer.

Injection Molding

Before injection molding, the compound was dried at 105° C. in an Arburg Thermolift dry air dryer for 4 hours. The injection molded dumbbell-shaped tensile specimens (ISO 527-2/1A type) and the plate samples (80 mm×80 mm×2 mm) were manufactured with an Arburg Allrounder 270 S 400-170 injection molding machine. The injection rate was 40 cm$^3$/s, holding pressure was 600 bar, holding time was 5.2 s, residual cooling time was 40 s, and melt temperatures were increased from 195 to 210° C. with 5° C. steps (from rear to front zone) while the mold temperature was set at 30° C.

Example 11

Morphology of the Filled Biopolymers

The morphology of the SCG-filled biopolymer was examined with a scanning electron microscope. The fracture surfaces of the injection molded specimens were studied with a JEOL® (Tokyo, Japan) JSM-6380LA scanning electron microscope (SEM) with an accelerating voltage of 10 kV. Before the test, the cryogenic fracture surface of the samples was sputter-coated with a gold-palladium alloy with JEOL®1200 (Tokyo, Japan) and fixed with a conductive double-sided carbon adhesive tape.

FIG. 4 compares the effects of SCG pretreatment methods on the morphology and distribution of the filler on the cryogenically fractured surfaces of the injection molded specimens. It is well known that the mechanical properties of blends are strongly dependent on their morphology and controlling the morphology is crucial for the final properties of the product. FIG. 4 panels (a) through (d) are scanning electron microscope (SEM) micrographs of PHB-based biopolymers at 100× (left panel) and 2000× (right panel) magnification. FIG. 4(a) shows the micrograph of PHB:SCG polymers, with untreated, dried "A"-SCG. FIG. 4(b) shows the micrograph of PHB:SCG polymers, with dried, substantially lipid-free polyphenol-free "B"-SCG. FIG. 4(c) is the micrograph of PHB:SCG polymers, with dried, substantially lipid-free polyphenol-free, and hemicellulose-free "C"-SCG. FIG. 4(d) shows the micrograph of PHB:SCG polymers, with dried, substantially lipid-free hemicellulose-free "D"-SCG. The amount of the plant-based filler was 20% in all settings.

Figure 4A:
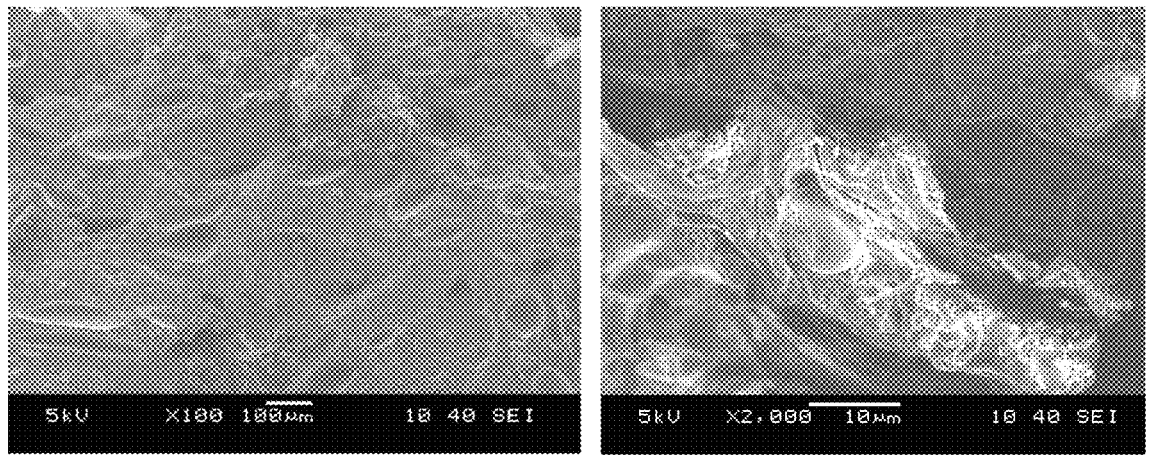
FIGS. 4(a)-4(d) are scanning electron microscope (SEM) micrographs at 100× and 2000× magnification of exemplary PHB-based biopolymers containing 20% (w/w) spent coffee grounds (SCG) with varying pretreatment methods.
Figure 5:
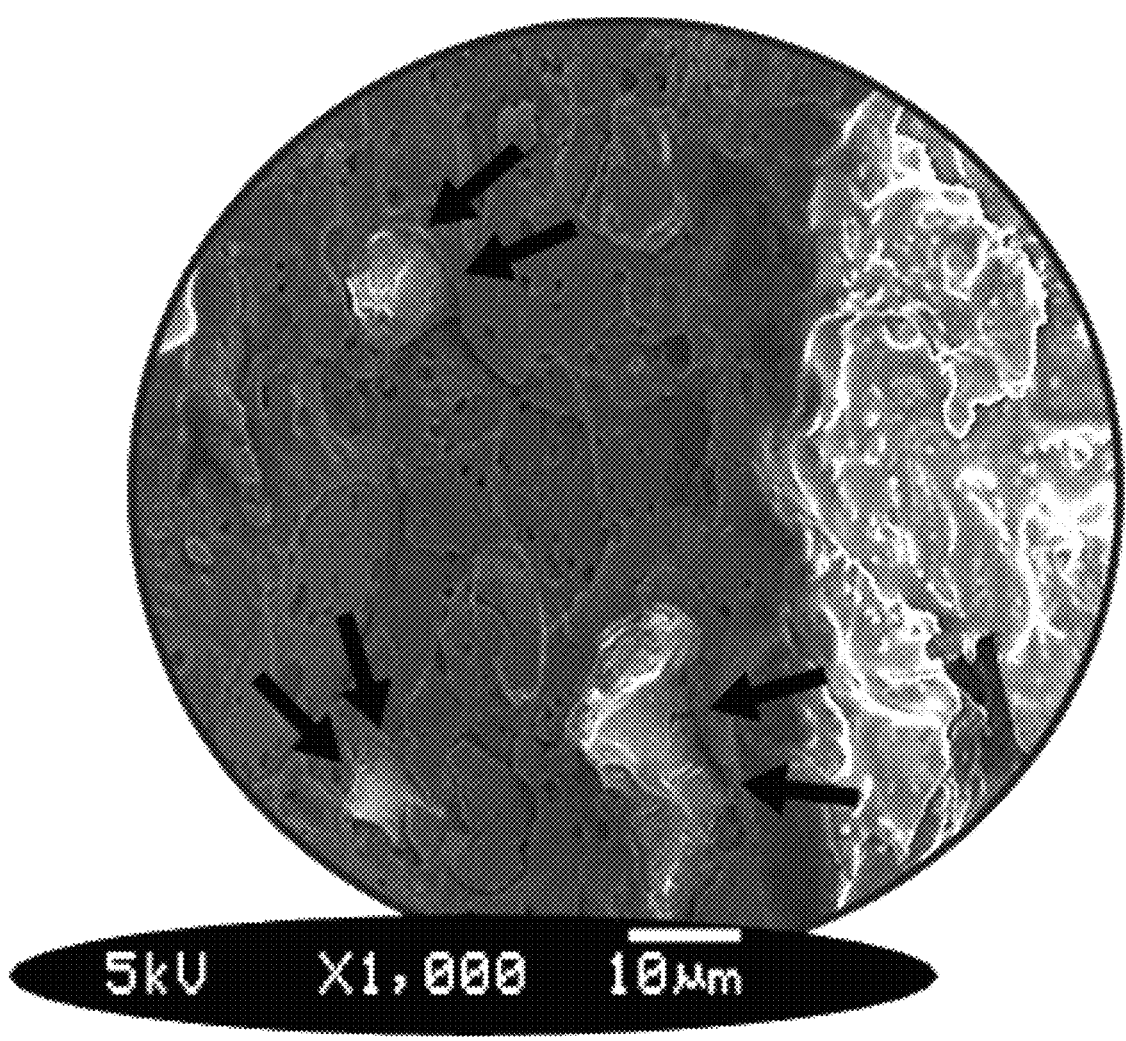
FIG. 5 is a SEM micrograph of a biopolymer containing 20% (w/w) untreated, dried SCG at 1000× magnification. This figure shows the same sample as shown in FIG. 4a at a different magnification.

Micrographs of PHB-based biopolymer containing untreated SCG show an uneven surface with cavities and holes (FIG. 4a). In addition, aggregation of the untreated SCG particles can also be observed (FIG. 5). FIG. 5 is a SEM micrograph of PHB:SCG polymer containing untreated, dried "A"-SCG at 1000× magnification. The amount of the plant-based filler was 20%. This figure shows the same sample as shown in FIG. 4(a). The SEM image shows the interfaces between the untreated SCG particles and the polymer. Black arrows accentuate the interfaces. As shown in FIG. 5, untreated SCG particles are not dispersed evenly in the polymer matrix, where some particles are concentrated in the holes and are completely separated from the PHB matrix. The sharp interface between the matrix and the untreated SCG is indicated by arrows.

Due to the presence of these holes, in the case of untreated SCG, poor filler-matrix adhesion can be inferred, which has a negative effect on the mechanical and barrier properties of the base polymer.

Figure 4B:
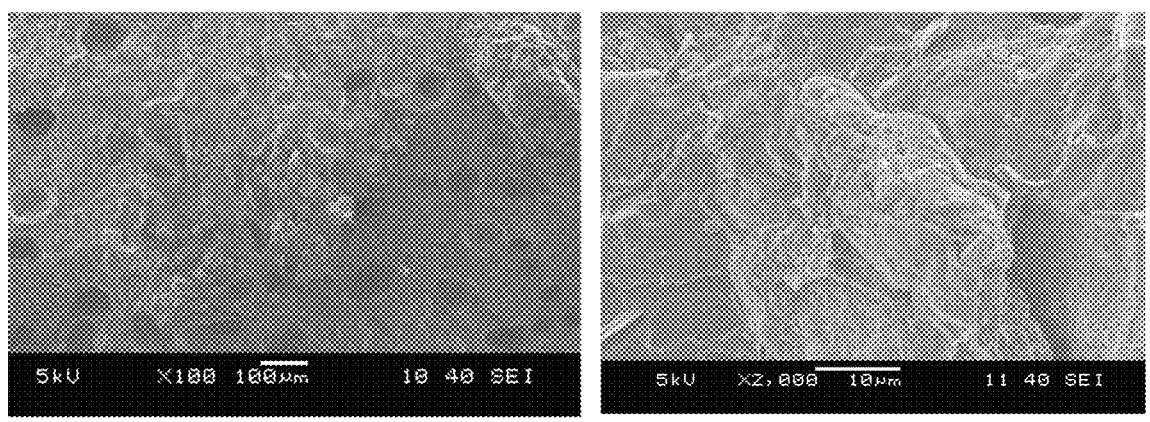

With pretreatment "B," the size, depth and quantity of the holes was significantly reduced, which is visible at both 100× and 2000× magnifications (FIG. 4(b)). In this case, filler aggregation was not observed. The removal of the lipids is clearly necessary to achieve a good result, but it is still not sufficient. After removing hemicellulose and the lipids (FIG. 4(d)) or hemicellulose, the lipids, and polyphenols (FIG. 4(c)), the overall morphology became completely homogeneous and the holes completely disappeared. According to the SEM micrographs (FIGS. 4(c), 4(d)) a high degree of dispersion and homogeneity of the "C"-SCG and/or "D"-SCG particles was observed in the polymer matrix.

Figure 4C:
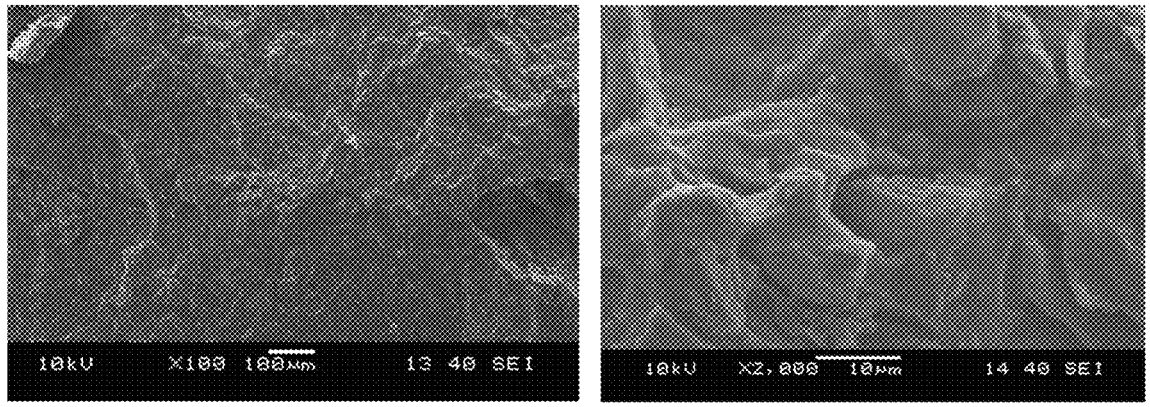
Figure 4D:
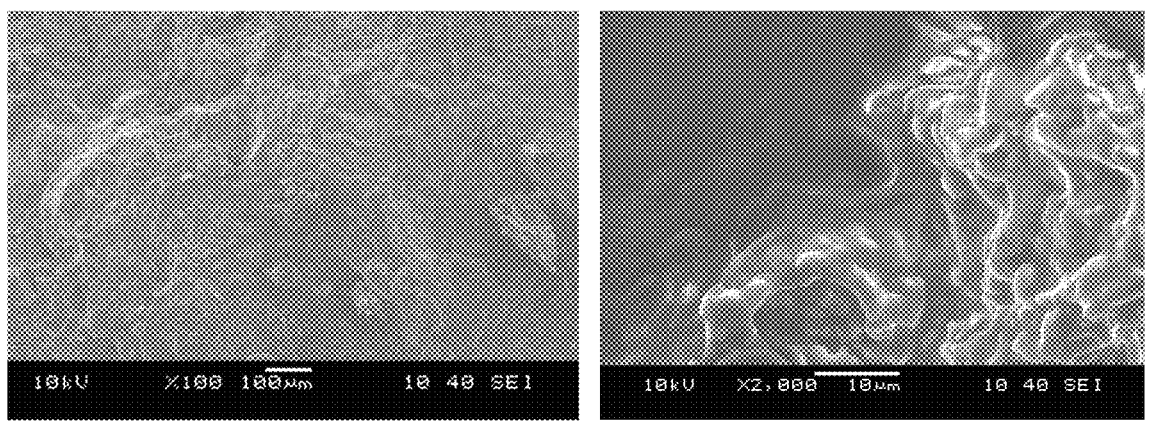

Overall, in these cases (FIGS. 4(c), 4(d)), the interfacial adhesion between the treated SCG (C-D) and the polymer matrix was excellent. Pretreatment process "D" covers an extraction process described earlier, where lipid extraction is followed by dilute acid hydrolysis. Pretreatment process "C" corresponds to the extraction process with two immiscible solvents described previously, and the resulting substantially lipid-free polyphenol-free spent coffee ground was then subjected to dilute acid hydrolysis. The amount of the plant-based filler was 20% in all settings.

After establishing how the individual pretreatment processes affect the morphology of PHB-based polymers, interfacial adhesion between, e.g., PLA and "C"-SCG was examined. Compounding was carried out with a filler content of 20%. FIG. 5 shows that a completely homogeneous biopolymer system was also obtained in the case of PLA, and the interfacial adhesion between the treated SCG particles and the PLA matrix appears to be excellent.

Figure 6:
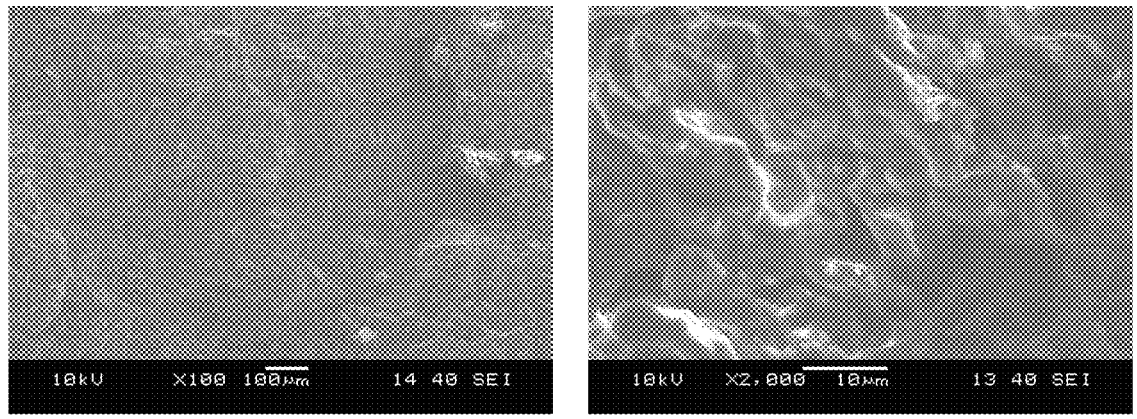
FIG. 6 is a SEM micrograph of a PLA-based biopolymer prepared with 20% (w/w) dried, substantially lipid-free polyphenol-free and hemicellulose-free SCG at 100× and 2000× magnification.

FIG. 6 is a SEM micrograph of PLA-based biopolymers at 100× (left panel) and 2000× (right panel) magnification. The biopolymers shown in this figure were PLA:SCG using dried, substantially lipid-free polyphenol-free and hemicellulose-free "C"-SCG. The amount of plant-based filler was 20%.

Figure 7A:
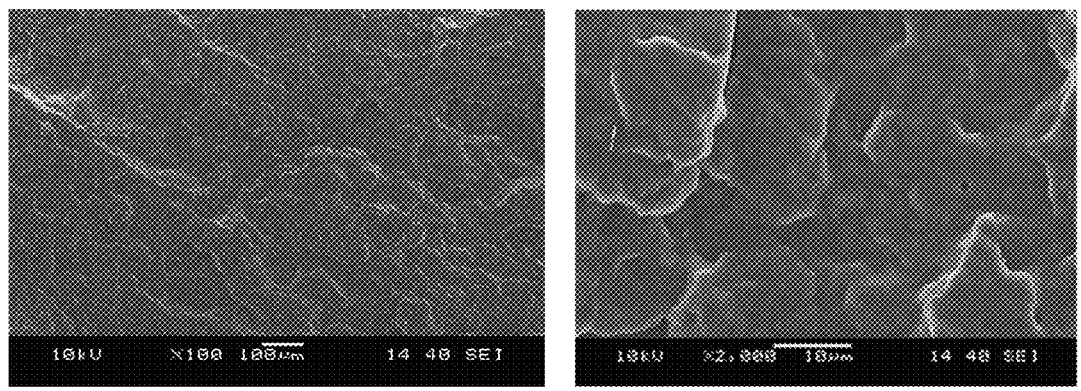
FIGS. 7(a)-7(h) are SEM micrographs of biopolymers product and/or compounded biomass-polymer blend with varying percentages of dried, substantially lipid-free polyphenol-free and hemicellulose-free SCG at 100× and 2000× magnification.
Figure 7B:
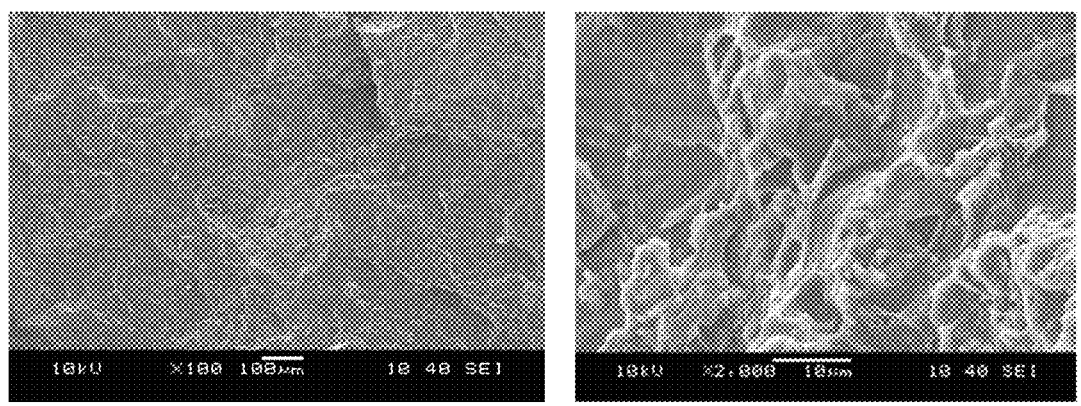
Figure 7C:
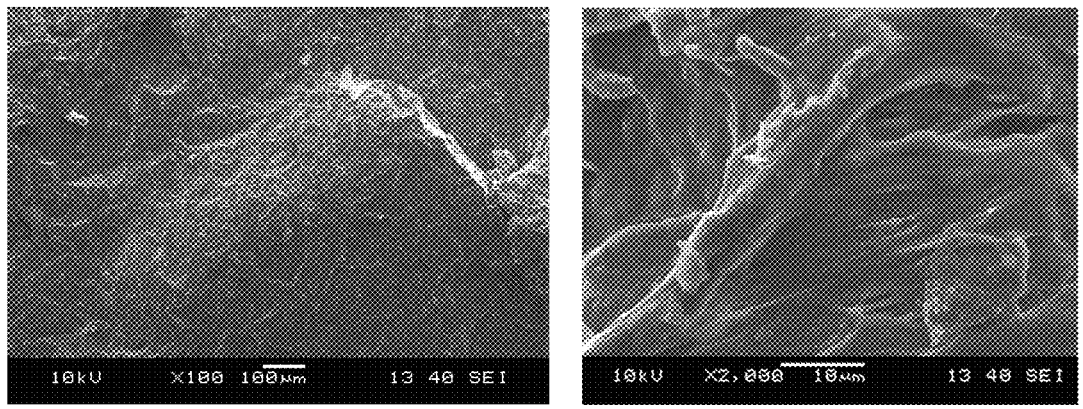
Figure 7D:
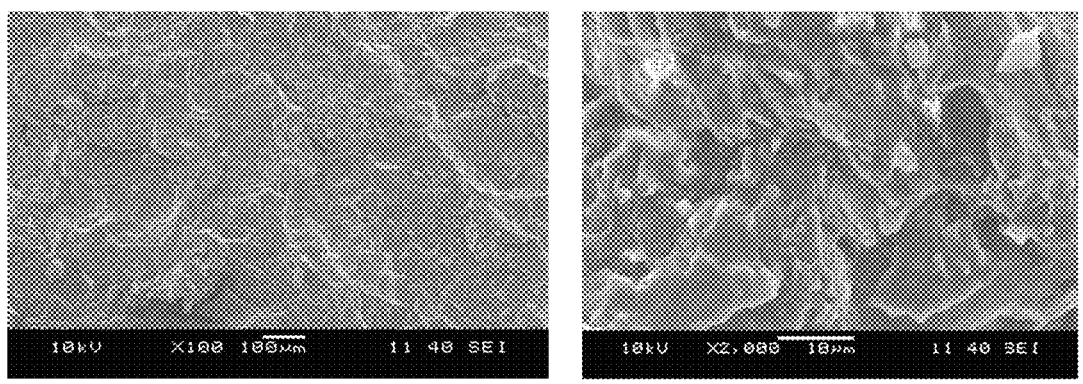
Figure 7E:
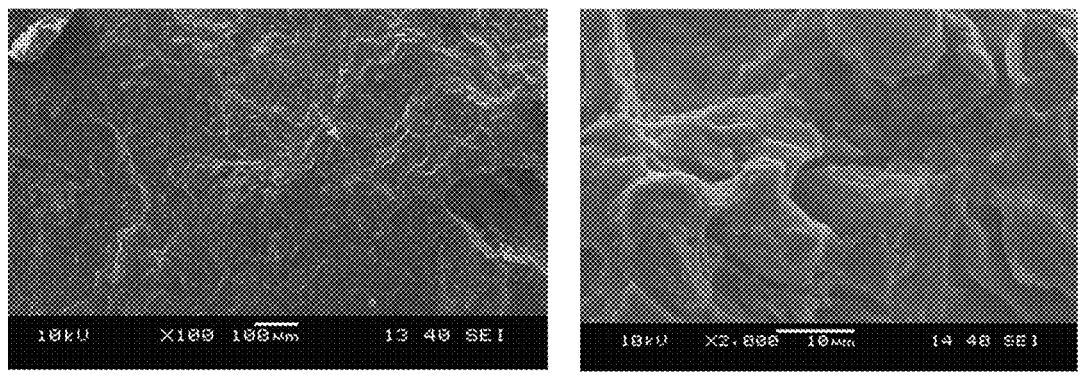
Figure 7F:
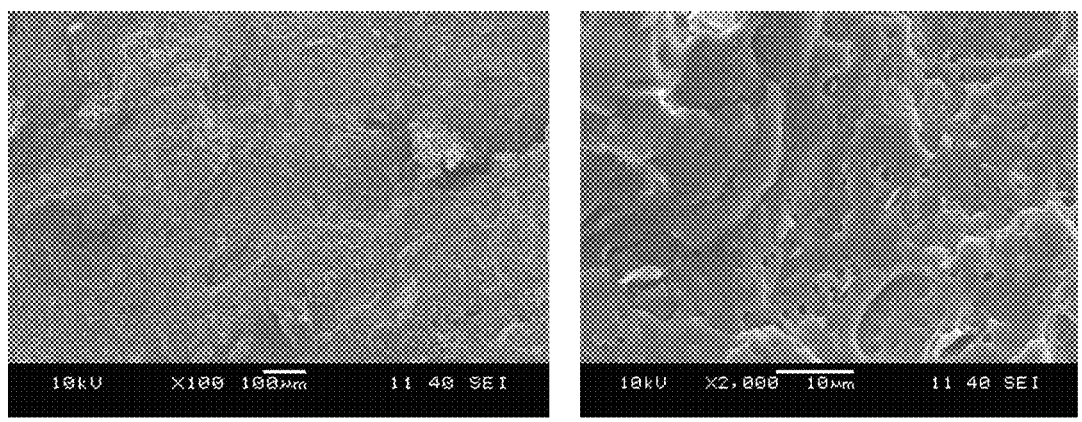
Figure 7G:
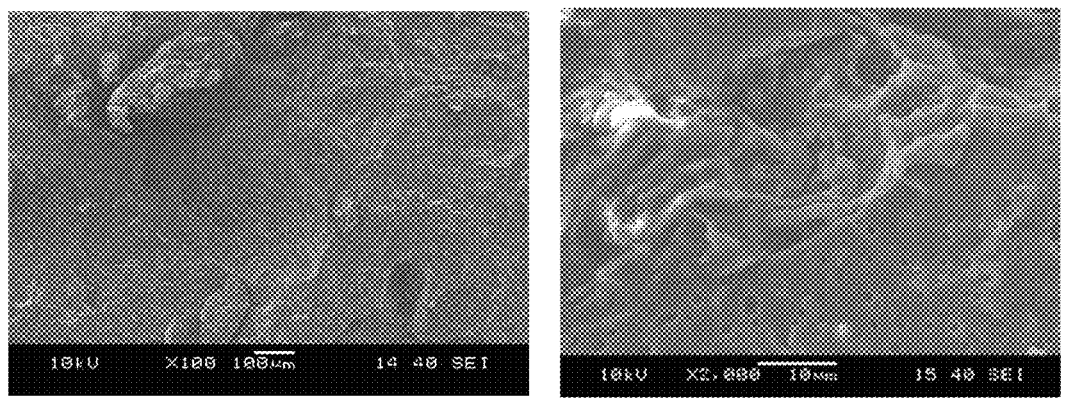
Figure 7H:
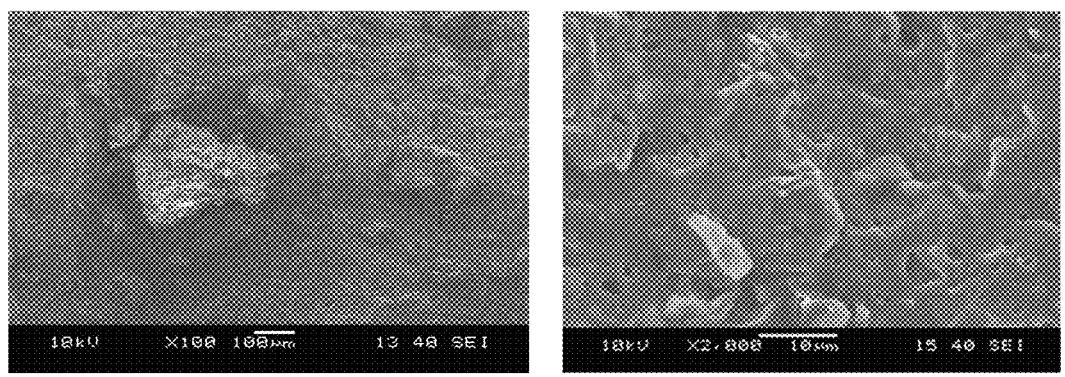

Next, the loading levels of "C"-SCG (0-40%) in PHB-based biopolymers were examined. The effect of filler concentration on the filler/matrix interaction was demonstrated through SEM images, shown in FIG. 7. FIG. 7 is a SEM micrograph of PHB:SCG biopolymers at 100× (left panel) and 2000× (right panel) magnification. PHB: "C"-SCG biopolymers (dried, substantially lipid-free polyphenol-free and hemicellulose-free SCG) are shown at different loading levels: FIG. 7(a) is 0% SCG (i.e., 0% SCG+100% PHB). FIG. 7(b) is 5% SCG (i.e., 5% SCG+95% PHB). FIG. 7(c) is 10% SCG (i.e., 10% SCG+90% PHB). FIG. 7(d) is 15% SCG (i.e., 15% SCG+85% PHB). FIG. 7(e) is 20% SCG (i.e., 20% SCG+80% PHB). FIG. 7(f) is 25% SCG (i.e., 25% SCG+75% PHB). FIG. 7(g) is 30% SCG (i.e., 30% SCG+70% PHB). FIG. 7(h) is 40% SCG (i.e., 40% SCG+60% PHB).

The filler content up to 20% (FIGS. 7(b)-7(e)) does not significantly affect the morphological properties of the biopolymers, including microstructural homogeneity and filler distribution in the polymer matrix. However, with the further increase of the filler to 25% (FIG. 7f), then to 30% (FIG. 7g), and 40% (FIG. 7(h)), the filler particles formed agglomerations, their dispersibility in the matrix deteriorated significantly and holes appeared in the structure.

Example 12

Mechanical Properties and Heat Deflection Temperature of Filled Biopolymers
Differential Scanning Calorimetry (DSC)

Differential scanning calorimetry (DSC) test of PHB was carried out according to the standard MSZ EN ISO 11357 with a TA® Instruments (New Castle, DE, USA) Q2000. Samples were cut with a scalpel and weighed using a Sartorius® Quintix® 125D semi-micro balance. In the case of PHB-based materials, the measurements were performed at temperatures between −20 and 220° C. with heating and cooling rates of 5° C./min using a heat-cool-heat program. In the case of PLA-based materials, the temperature range was 0-200° C., the heating rate was 5° C./min with a heat-cool-heat program. The degree of crystallinity ($\chi_c$) was calculated according to Equation (1), $$\chi_c = \frac{\Delta H_m - \Delta H_{cc}}{\Delta H_m^0} \cdot 100[\%], \quad (1)$$

where $\Delta H_m$ [J/g] is the melting enthalpy of crystallization of the polymer, equal to the area under the crystallization curve, $\Delta H_{cc}$ [J/g] is the enthalpy of cold crystallization of the polymer, $\Delta H_m^0$ [J/g] is the theoretical melting enthalpy of 100% crystalline PHB material, which is 146 J/g (Laycocka, L., et. al. "The chemomechanical properties of microbial polyhydroxyalkanoates." *Progress in Polymer Sciences*, Vol. 38, no. 3-4, (March-April 2013), pp. 536-583. doi: 10.1016/j.progpolymsci.2012.06.003). The theoretical melting enthalpy of 100% crystalline PLA material is 93 J/g (Hajba, Sándor, and Tamás Tábi. "Cross Effect of Natural Rubber and Annealing on the Properties of Poly(Lactic Acid)." *Periodica Polytechnica Mechanical* Engineering, Vol. 63, no. 4 (2019), pp. 270-277. doi: 10.3311/PPme.12825).

Figure 8:
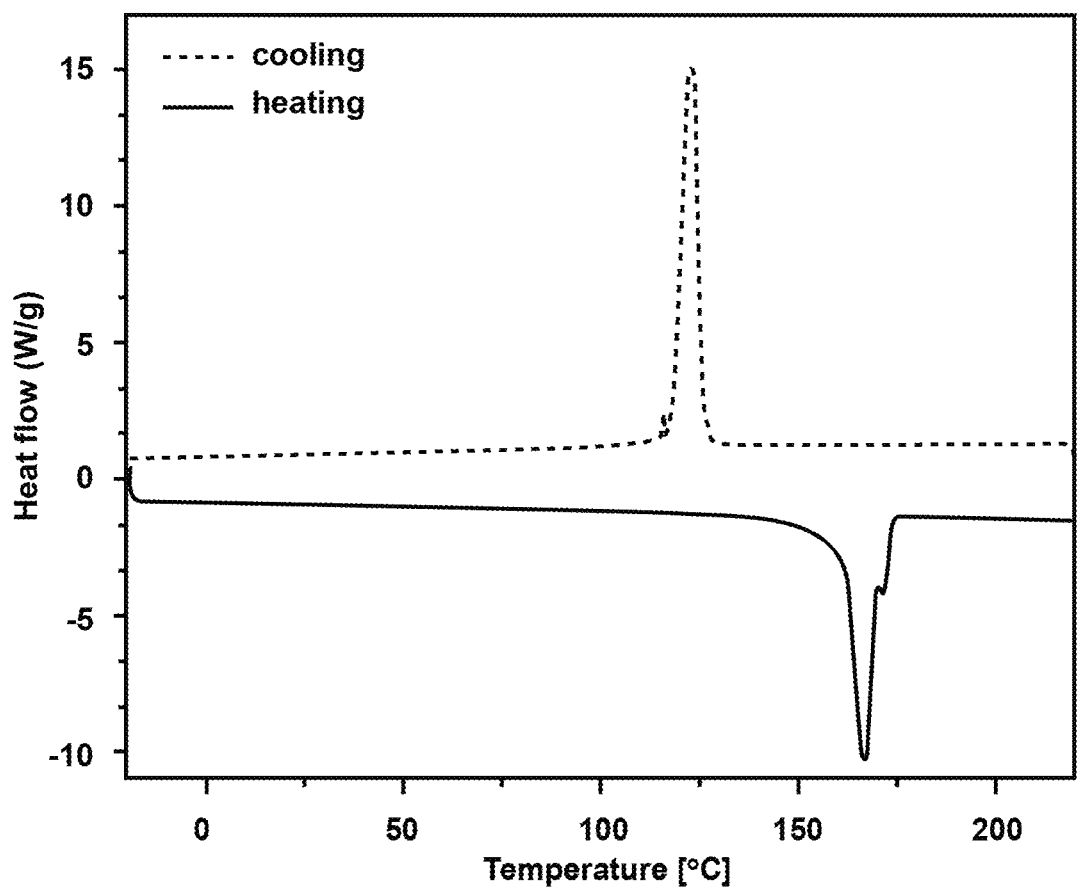
FIG. 8 shows the differential scanning calorimetry thermograms from Example 12.

Numerical results of the DSC measurement, including the glass transition temperature ($T_g$), melting temperature ($T_m$), crystallization temperature ($T_c$), enthalpy of fusion ($\Delta H_m$), enthalpy of crystallization ($\Delta H_c$), and degree of crystallinity ($X_C\%$), are found in Table 1 below. FIG. 8 shows the thermogram for the DSC measurement.

TABLE 1

Thermal properties of PHB determined via differential scanning analysis (DSC):

| | | |
|---|---|---|
| HEATING | $T_g$ (° C.) | 12.18 |
| | $T_m$ (° C.) | 167.4 |
| | $\Delta H_m$ (J/g) | 105.0 |
| | $X_C$ (%) | 71.9 |
| COOLING | $T_e$ (° C.) | 122.4 |
| | $\Delta H_c$ (J/g) | 98.15 |

Tensile Test

Tensile tests were performed on a Zwick Z005 testing machine at 22° C. and relative humidity of 50%. An AST Mess & Regeltechnik KAP-TC load cell was used (measuring range 0-5000 N, preload 1 N). The tensile modulus was calculated between 0.05% and 0.25% strain using a crosshead speed of 1 mm/min and determined tensile strength (calculated at the first local maximum force of the tensile curve), stress at break and elongation at break using a crosshead speed of 20 mm/min. The tests were performed on ISO 527-2/1A dumbbell-shaped specimens with an overall length of 170 mm and a cross-section of 4 mm×10 mm. The results are summarized in Tables 3 and 4.

Falling Weight Impact Test

Injection molded samples with a nominal dimension of 80 mm×80 mm×2 mm were subjected to falling weight impact tests on a Ceast Fractovis 9350 impact testing machine. The measurement parameters used are shown in Table 2 below. The specimens were positioned with the aid of a clamping ring, the hemispherical-ended impactor was dropped from a given height onto the specimen, and the force generated during the puncture of the specimen was recorded as a function of time. The piezoelectric force sensor used has a maximum capacity of 4.5 kN, while data was acquired with a Ceast DAS 64 k High-Speed Data Acquisition Unit at 1 MHz.

TABLE 2

Test parameters used during the impact testing

| | |
|---|---|
| Temperature | 23° C. |
| Impactor geometry | cylinder with hemispherical end |
| Diameter of the striker | 20 mm |
| Drop height | 405 mm |
| Mass of the impactor | 5.03 kg |
| Impact energy | 20 J |
| Impact velocity | 2.82 m/s |
| Specimen positioning | pneumatic clamping ring |

From these data, it is possible to conclude the failure behavior, (the resistance of the specimens to dynamic mechanical loading).

In the evaluation, the following data were calculated from the resulting curves:

$F_{max}$—the peak force generated during puncture [N]

$E_{perf}$—perforation energy [J/mm]

The perforation energy (2) can be calculated from specimen thickness (h) and the energy required to break the specimen, as follows:

$$E_{perf} = \frac{E_{total}}{h} \qquad (2)$$

where $E_{perf}$ is the perforation energy [J/mm], $E_{total}$ [J] is the total energy absorbed during the impact, h [mm] is the thickness of the sample. For each sample, five specimens were tested, and the average values were calculated. The results are summarized in Tables 3 and 4.

Notched Charpy Impact Strength

The Charpy impact strength was tested on a Ceast Resil Impactor Junior impact tester, with a 2 J pendulum. The measurements were performed on 2 mm notched ISO 179–1/1eA specimens with a length of 80 mm and a cross-section of 4 mm×10 mm. The tests were carried out at room temperature and a relative humidity of 50%. The tests were repeated 10 times for each compound. Average values of 1-5 KJ/m² were obtained.

Dynamic Mechanical Analysis

Figure 9:
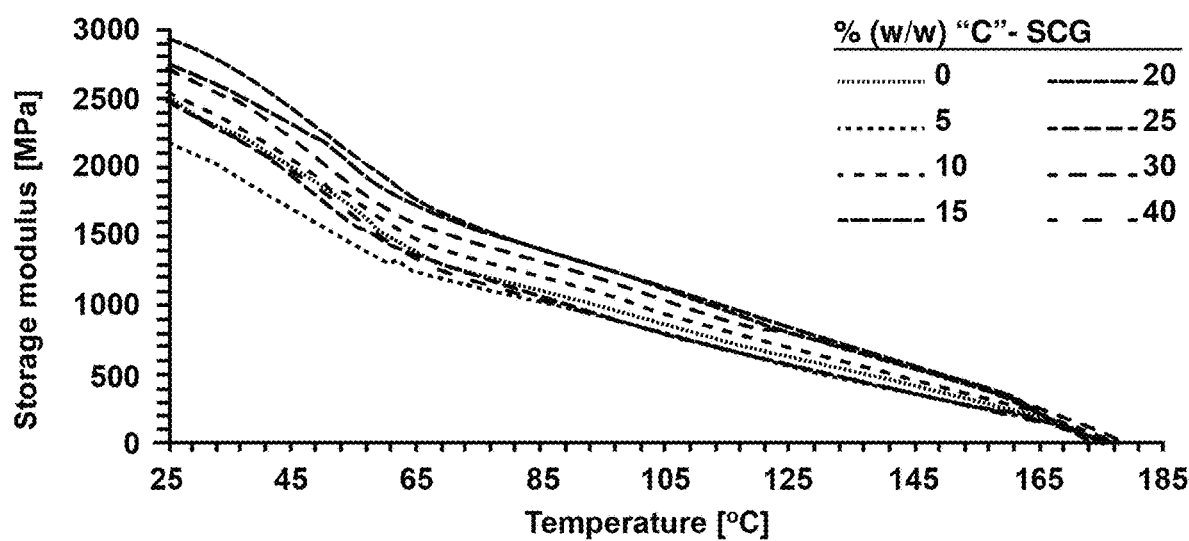
FIG. 9 shows the storage modulus as a function of temperature from Example 12.
Figure 10:
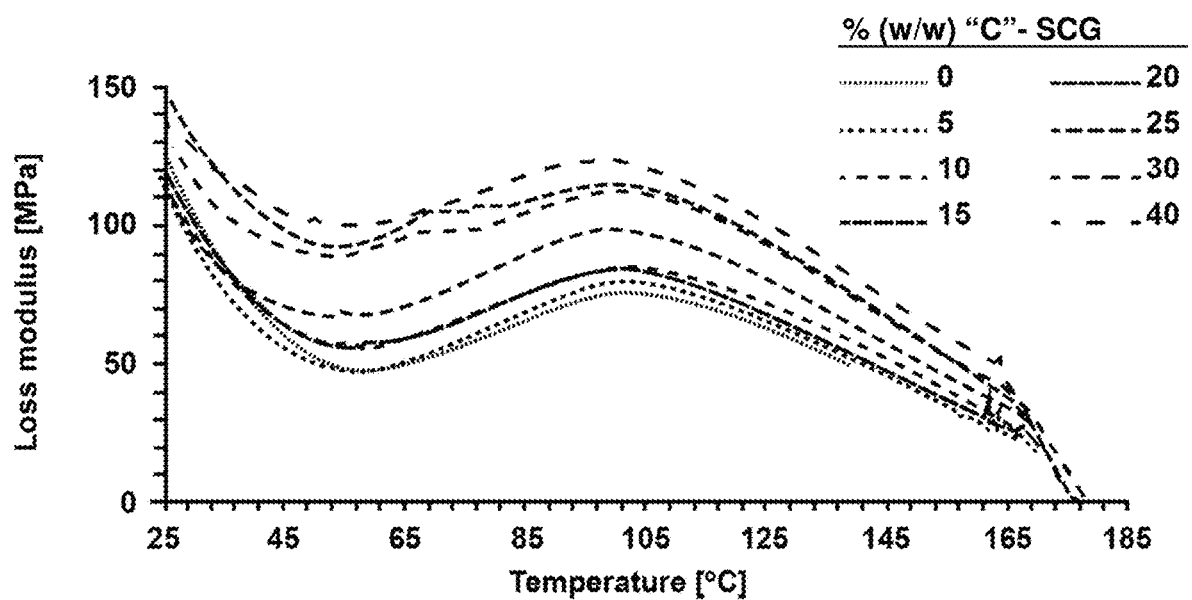
FIG. 10 shows the loss modulus as a function of temperature from Example 12.
Figure 11:
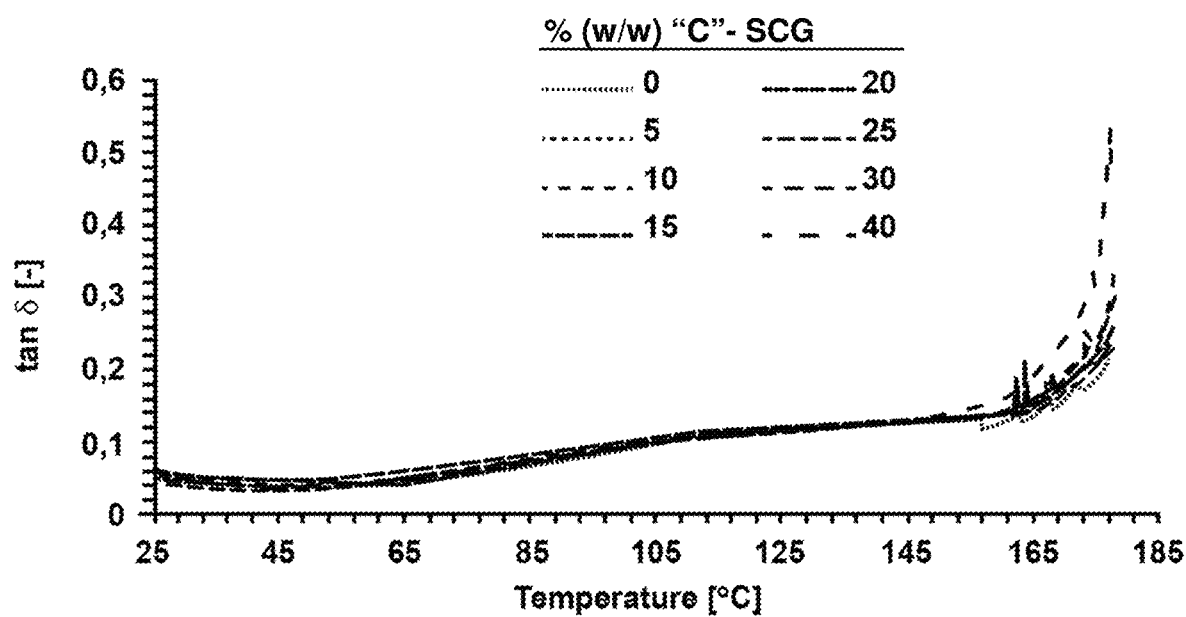
FIG. 11 shows the loss factor (tan 6) as a function of temperature from Example 12.

Dynamic mechanical analysis (DMA) tests were performed with a TA® Instruments Q800 device. The temperature range was 25-175° C., and the heating rate was 2° C./min. The test was performed in dual cantilever mode, with a 35 mm wide support. The width, thickness, and length of the samples (prepared from injection molded Charpy test specimens) were 10 mm, 4 mm, and 60 mm, respectively. The amplitude of periodic bending was 20 μm, and the frequency was 1 Hz. Results are shown in FIGS. 9, 10, and 11.

Heat Deflection Temperature

The heat deflection temperature (HDT) was determined with a Ceast HV3 6911.000 device according to MSZ EN ISO 75-2, with flexural stress of 0.45 MPa (method B). The test samples were the same as Charpy test specimens, with dimensions of 4 mm×10 mm×80 mm. The support distance was 64 mm. According to the standard, the heating rate was 120° C./hour starting from 30° C. The measurements were performed on injection-molded samples with a thickness of 1.5 mm.

The mechanical properties were investigated at different loading levels of "C"-SCG (0-40%) in PHB-based biopolymers (Table 3). Since neat PHB already has excellent thermal properties, the effect of the pretreated filler did not cause improvement of the HDT value of the base polymer; however, in the case of PLA, pre-treated filler may have a positive effect on the thermal properties. As expected, the mechanical properties were consistent with the morphological properties observed in the SEM images. Consequently, the filler agglomerations and holes observed at higher filler contents (≥25%) negatively affect the mechanical properties, especially the tensile strength, elongation at break and Young's modulus. Below 25% filler content, the mechanical properties were only slightly deteriorated compared to neat PHB, meaning the advantages incurred by incorporating a fiber-based filler would not reduce the mechanical properties of the resultant biopolymer. Furthermore, highlighting the 10 and 20% filling levels and comparing them with the mechanical properties of other neat polymers, it can be seen that the biopolymer performs in the expected range. The PHB-based biopolymers of Table 3 had a tensile strength in the range of from 15 to about 40 MPa, or from about 20 to about 35 MPa, a stress at break of from about 15 to about 40 MPa, or from about 25 to about 35 MPa, an elongation at break of from about 1 to 3%, or from about 2 to about 3%, a Young's modulus of from about 2,500 to about 2,900 MPa, or from about 2,600 to about 2,900 MPa, an HDT at 0.45 MPa of from about 130-150° C., or from about 135-140° C., a maximum force of from about 250 to about 350 N, or from about 325 to about 340 N, and a perforation energy of from about 0.5 to about 0.6 J/mm.

As seen in Table 4 below, any limitations are due to the nature of the neat PHB biopolymer, except in the case of Young's modulus. However, the biopolymer has better tensile strength than neat PCL and PBAT, and behaves similar to that of neat PP and PBS. Elongation at break values are in the same order of magnitude as PLA and PBS and the limitations are due to the nature of the base neat PHB biopolymer. In order to achieve industrially advantageous mechanical properties for neat polymers, it is conventionally necessary to use additives, e.g., plasticizers, which can significantly improve the above limitations. For example, considering previous scientific publications on PLA, a relatively small amount of plasticizer can increase the elongation at break of the polymer by two orders of magnitude. A similar improvement in tensile properties has been described for PHB by blending with other biopolymers. Overall, even 3-4% elongation at break is more than ideal for an injection molded product.

TABLE 3

Comparison of mechanical properties of PHB-based biopolymers at different "C"-SCG loading levels

| PHB + % SCG | Tensile strength (MPa) | Stress at break (MPa) | Elongation at break (%) | Young's modulus (MPa) | HDT (0.45 MPa; ° C.) | Maximum force (N) | Perforation energy (J/mm) |
|---|---|---|---|---|---|---|---|
| neat PHB | 37.6 | 37.2 | 2.5 | 2896 | 139.7 | 327.9 | 0.62 |
| 5% | 34.2 | 34.0 | 2.8 | 2670 | 135.6 | 334.2 | 0.59 |
| 10% | 31.7 | 31.5 | 2.1 | 2845 | 140.4 | 334.2 | 0.64 |
| 15% | 27.8 | 27.0 | 2.0 | 2630 | 133.4 | 303.0 | 0.49 |
| 20% | 27.0 | 27.0 | 2.0 | 2778 | 139.3 | 333.4 | 0.58 |
| 25% | 24.8 | 24.2 | 1.6 | 2577 | 139.7 | 305.2 | 0.53 |
| 30% | 23.0 | 23.0 | 1.2 | 2729 | 144.3 | 285.2 | 0.53 |
| 40% | 19.4 | 19.4 | 1.1 | 2623 | 144.0 | 258.7 | 0.55 |

TABLE 4

HDT and Tensile properties of common polymers and PHB-based polymers

| | Polymer | Tensile strength (MPa) | Elongation at break (%) | Young's modulus (GPa) | HDT (0.45 MPa; ° C.) |
|---|---|---|---|---|---|
| Literature Data[3] | PP | 20-40 | 150-600 | 1.1-1.6 | 100-200 |
| | PCL | 10-16[4] | 600-900 | 0.38-0.43 | 55[5] |
| | PLA | 52-54 | 2-2.2 | 3.4-3.6 | 53-56 |
| | PBS | 26-28[6] | 4-5[5] | 0.8-1.1[5] | 85-95[7] |
| | PBAT | 21[8] | 670[6] | 0.12-0.16[6] | 44-47[8] |
| | PET | 45-70 | 2.5 | 2.8-3.5 | 75-115 |
| | neat PHB | 37.6 | 30-70 | 2.9 | 139.7 |
| | PHB+10% | 31.7 | 2.1 | 2.85 | 140.4 |
| | PHB+20% | 27.0 | 2.0 | 2.78 | 139.3 |

PP: polypropylene,
PCL: polycaprolactone,
PLA: polylactic acid,
PBS: polybutylene succinate,
PBAT: polybutylene adipate terephthalate,
PET: polyethylene terephthalate.
[3]Literature data of polymers were found in the database of omnexus.specialchem.com, except as otherwise marked.
[4]doi: 10.1016/j.actbio.2010.02.002.
[5]10.1016/j.polymertesting.2021.107282.
[6]10.1007/s00289-017-2217-6.
[7]10.1063/1.4918505
[8]10.1016/j.aiepr.2020.01.001.

Dynamic Mechanical Properties of Filled Biopolymers

Dynamic mechanical analysis (DMA) tests were performed and evaluated. In all cases, "C"-SCG was used during compounding. Based on the results, it can be concluded that the dynamic mechanical properties are not significantly affected by the filler content. The measured storage modulus as a function of temperature is shown in FIG. 9. The storage modulus of all biopolymers decreases at the same rate as the temperature increases. The measured loss modulus as a function of temperature is shown in FIG. 10. The measured loss factor (tan 6) as a function of temperature is shown in FIG. 11. In this temperature range (25-185° C.) the glass transition cannot be interpreted on the curves.

Example 13

Oxygen Transmission Rate (OTR) and Water Vapor Transmission Rate (WVTR) of Filled Biopolymers The oxygen barrier properties (oxygen transmission rate, OTR) of the specimens were determined by an oxygen permeability testing system (Labthink® C230H) according to ASTM™ D3985-05" Standard Test Method for Oxygen Gas Transmission Rate Through Plastic Film and Sheeting Using a Coulometric Sensor," at 22° C. and 0% relative humidity. Oxygen transmission rates are expressed in $cm^3$ $m^{-2}$ 24 $h^{-1}$.

The water vaper barrier properties (water vapor transmission rate, WVTR) of the specimens were determined by a water vapor permeability testing system (Labthink® C301B) according to ASTM™ F1249 "Standard Test Method for Water Vapor Transmission Rate Through Plastic Film and Sheeting Using a Modulated Infrared Sensor," at 38° C. and 90% relative humidity. Water vapor transmission rates are expressed in g $m^{-2}$ 24 $h^{-1}$.

In each test, we performed three parallel measurements; the values given below are the average values. The measurements were performed on samples with the following composition:
20% "C"+SCG+80% PHB
10% "C"+SCG+90% PHB
0% SCG+100% PHB (neat PHB)
20% "C"+SCG+80% PLA
0% SCG+100% PLA (neat PLA)

According to the ASTM™ D3985-05 standard, the oxygen barrier properties of the PLA or PHB-based biopolymers containing "C"-SCG were determined and evaluated, and the results were compared with the neat polymer. The OTR measurements were performed at 22° C. and 0% relative humidity on test specimens with a layer thickness of 1.5 mm.

According to the ASTM™ F1249 standard, the water vaper barrier properties of the PLA or PHB-based biopolymer containing "C"-SCG were determined and evaluated, and the results were compared with the neat polymer. The WVTR measurements were performed at 38° C. and 90% relative humidity on test specimens with a layer thickness of 1.5 mm.

Based on the results, a significant improvement was achieved in both OTR and WVTR values. Based on the literature data, it was often observed that during the developments, that while the OTR value improved, the WVTR value became worse. In our case, we managed to improve the barrier properties of the material synchronously.

The OTR value of the PLA-based biopolymer containing 20% "C"-SCG was 2.2 cm$^3$ m$^{-2}$ 24 h$^{-1}$, which is more than a two-fold decrease compared to neat PLA (5.8 cm$^3$ m$^{-2}$ 24 h$^{-1}$). The WVTR value of the PLA-based biopolymers containing 20% "C"-SCG was 2.3 g m$^{-2}$ 24 h$^{-1}$, which corresponds to a two-fold decrease compared to neat PLA (4.6 g$^3$ m$^{-2}$ 24 h$^{-1}$).

In the case of PHB-based "C"-SCG biopolymers, we investigated the effect of 10 and 20% filler content on the barrier properties, and compared the results with neat PHB. As the filler content increased 0%, 10%, 20%, the following decreasing trend was observed in the OTR values: 0.76, 0.23, 0.13 cm$^3$ m$^{-2}$ 24 h$^{-1}$ respectively. At the same time, a decreasing trend was also observed in the WVTR values with increasing the loading level 0%, 10%, 20% of the filler: 1.23, 1.00, 0.58 g m$^{-2}$ 24 h$^{-1}$ respectively. See Table 5 below.

TABLE 5

OTR and WVTR measurements of biopolymer with different amounts of SCG filler

| % (w/w) "C"-SCG:% Biopolymer | OTR (cm$^3$ m$^{-2}$ 24 h$^{-1}$) | WVTR (g m$^{-2}$ 24 h$^{-1}$) |
|---|---|---|
| 0% SCG:100% neat PLA | 5.8 | 4.6 |
| 20% SCG:80% PLA | 2.2 | 2.3 |
| 0% SCG:100% neat PHB | 0.76 | 1.23 |
| 10% SCG:90% PHB | 0.23 | 1.00 |
| 20% SCG:80% PHB | 0.13 | 0.58 |

Example 14

Compostability of Filled Biopolymers

According to the ISO20200:2015 standard, compostability tests were performed to assess the compostability profile of the PHB-based biopolymer containing "C"-SCG and compare the results with the neat polymer. The composting medium contained the following components listed as % of dry matter: sawdust (40%), rabbit feed (30%), corn starch (10%), mature compost (10%), sugar (5%), corn oil (4%), and urea (1%).

The moisture content of the medium was 55%. Reactor size was a 30×20×10 cm tightly closed container. Two holes, with a diameter of 5 mm on the 20 cm side, were prepared to ensure the aerobic condition and proper aeration. The lid of the container was covered by parafilm to minimize possible evaporation.

Experiments took place at a temperature of 58° C. for a minimum of 45 days and a maximum of 90 days. Due to the high-temperature conditions and requirements of continuously elevated temperature, the ISO20200:2015 standard composting procedure is shown in Table 6 below.

TABLE 6

ISO20200A:2015 standard composting procedure

| Days from the start | Operation |
|---|---|
| 0 | Weigh the initial mass of the reactor. |
| 1, 2, 3, 4, 7, 9, 11, 14 | Weigh the reactor, add water to restore the initial mass of the reactor. Mix the composting media. |
| 8, 10, 16, 18, 21, 23, 25, 28 | Weigh the reactor, add water to restore the initial mass of the reactor. Do not mix the composting media. |
| 30, 45 | Weigh the reactor, add water to restore the 80% of initial mass of the reactor. Mix the composting media. |
| After 45 days, twice a week | Weigh the reactor, add water to restore the 80% of initial mass of the reactor. Mix the composting media. |
| After 60 days, twice a week | Weigh the reactor, add water to restore the 70% of initial mass of the reactor. Mix the composting media |

After 90 days of the thermophilic period, a mesophilic period can be carried out for 90 days at 25° C. In this case, the reactor is measured, restored (by water) and mixed once a week.

The following samples were examined:
a) Neat PHB foils (sheet size: 2.5 cm×2.5 cm×0.06 cm thickness)
b) 15% "C"-SCGs+85% PHB foils (sheet size: 2.5 cm×2.5 cm×0.06 cm thickness)
c) Injection molded spoon: 15% "C"-SCG+85% PHB (thickness: 0.10-0.15 cm)

TABLE 7

Samples examined

| Neat PHB foil/01 | 0.335 g |
|---|---|
| Neat PHB foil/02 | 0.338 g |
| Neat PHB foil/03 | 0.321 g |
| | Σ = 0.994 g |
| 15% "C"-SCG + 85% PHB/01 | 0.386 g |
| 15% "C"-SCG + 85% PHB/02 | 0.380 g |
| 15% "C"-SCG + 85% PHB/03 | 0.405 g |
| | Σ = 1.171 g |
| Injection molded spoon (15% "C"-SCG + 85% PHB) | 5.495 g |

During composting, the mass of the reactor was continuously monitored and the tasks were followed as described in the ISO standard above. Hence, per ISO standard instructions, the water content was restored in the specified task on the given day. After 90 days, the weight of the sheets was re-measured. Since the labels marking the samples became invisible in the composting medium, only the total weight of the foils was measured and compared with the initial total weight.

After 90 days, the weight of the sheets was re-measured:
a) After 90 days, the total weight of the neat PHB foil was 0.175 g, which corresponds to a weight loss of 82%.
b) After 90 days, the total weight of the foil containing 15% "C"-SCGs+85% PHB was 0.046 g, which corresponds to a weight loss of 97%.
c) After 90 days, the total weight of the spoon containing 15% "C"-SCGs+85% PHB was 2.766 g, which corresponds to a weight loss of 50%.

The speed of biological degradation strongly depended on the wall thickness. By definition, the thicker a material is, the slower complete biodegradation occurs. In the case of the spoon, the initial wall thickness was between 0.10 cm to 0.15 cm. In contrast, the initial thickness of the foils was only 0.05 cm. However, in addition to the wall thickness, the chemical composition of the sample significantly influenced the rate of biological degradation. Based on the results, it can be concluded that the biodegradation is approximately double in the case of the PHB-based foil containing the treated "C"-SCG, compared to the neat PHB-based foils. Due to the chemical composition of the filler (e.g., cellulose, lignin), the biopolymer of the present disclosure provides a more favorable environment for the microbial consortium involved in the biodegradation, as it contains much more easily accessible components.

Figure 12:
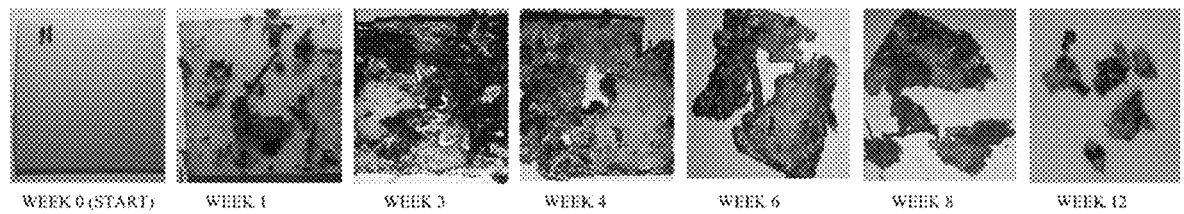
FIG. 12 shows the biological degradation of biopolymer product samples and/or compounded biomass-polymer blend samples, prepared with dried, substantially lipid-free polyphenol-free and hemicellulose-free SCG, under standardized composting conditions over time from Example 14.
Figure 12:
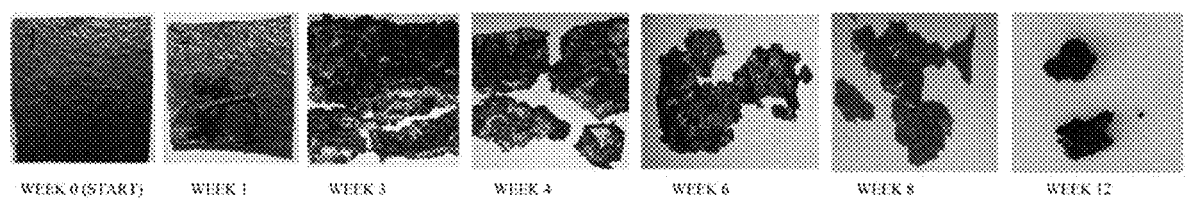
Figure 12:
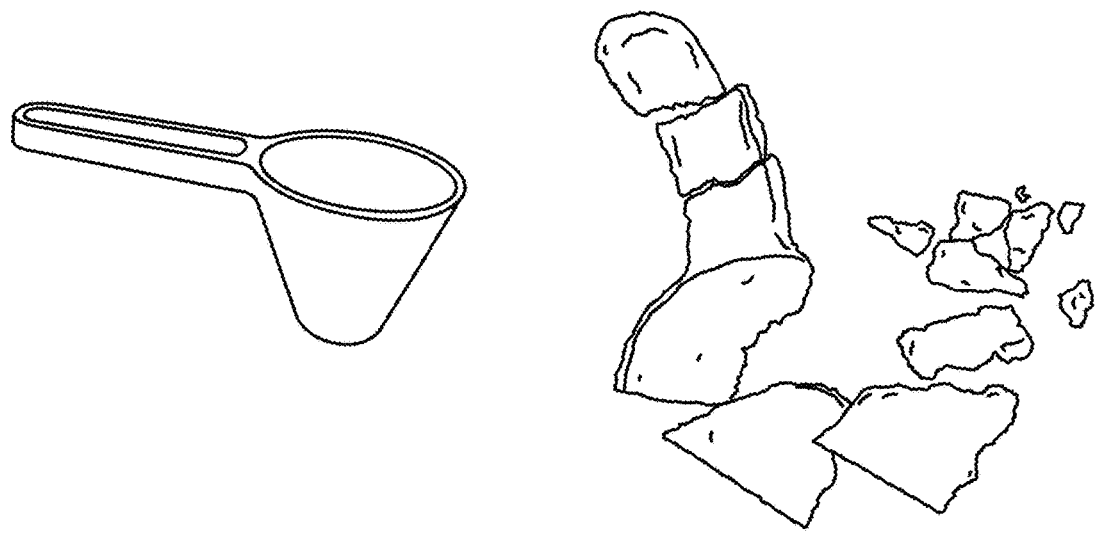

The surface changes and other visual changes were monitored during the composting experiment on the polymer samples. The biological degradation of PHB:SCG biopolymer samples under standardized composting conditions is shown in FIG. 12.

Example 15

Safety Assessment

As part of the safety assessment of polyester-based compounds containing "C"-SCG, the substances that can be extracted from the biopolymer were examined and evaluated.

Test Specimen Production

Injection molded test specimens (with 2 mm thickness) containing "C" SCG were investigated. The following injection molded samples were examined:
PHB+5SCG: 5% "C"-SCG+95% PHB
PHB+10SCG: 10% "C"-SCG+90% PHB
PHB+15SCG: 15% "C"-SCG+85% PHB
PHB+20SCG: 20% "C"-SCG+80% PHB
PLA+20SCG: 20% "C"-SCG+80% PLA Sample-Preparation For the excessive extraction of substances present in polyester-based compounds, an aggressive extractant for polyesters—i.e., absolute ethanol (anhydrous grade, Molar Chemicals Kft., Halásztelek, Hungary)—was chosen for the experiments. Prior to the immersion of test specimens into the extraction medium, surface contaminations were removed with n-hexane (CHROMASOLV™ grade, product of Honeywell® International Inc., Charlotte, North Carolina, USA), and the weights of test articles ($m_{pre}$) were measured with analytical balance (resolution: 0.0001 g; PR124, OHAUS® Europe GmbH, Nanikon, Switzerland). The test specimens were placed into absolute ethanol containing vials ($m_{vial}$), the applied surface to volume ratio was 0.6 cm²/mL. Extraction was carried out via sonication (with an Emmi-H40 ultrasonic bath, EMAG® AG, MÖrfelden-Walldorf, Germany). The temperature of the water bath was held at 60° C., while the applied extraction time was 200 minutes. After sonication, the test specimens were removed from the vials, any solvent remains were gently wiped off, and the weight of test articles was determined with analytical balance ($m_{post}$).

The extractants were concentrated via evaporation under gentle nitrogen stream (using an MD-200 instrument, Hangzhou Allsheng™ Instruments Co., Ltd., Hangzhou, China), and one tenth of the samples was set aside for GC-EI-QMS analysis. The applied enrichment factor was 13. Prior to the analysis, n-hexadecane (nC16) (Merck KGaA, Darmstadt, Germany) was added to the samples as internal standard (ISTD) at 20 µg/mL concentration level. For the gravimetric analysis of the sum of migrated compounds, the remaining solutions were evaporated until dryness. The solvent remains were removed with overnight vacuum drying at room temperature and 50 mbar pressure (using a Binder® VD56 type drying chamber, Binder® GmbH, Tuttlingen, Germany). Eventually, the mass of the dry samples ($m_{drysample}$) was measured with an analytical balance.

To be able to examine the extracted components with low thermal stability, the dried samples were redissolved in ethyl acetate (a.r. grade, Molar Chemicals Kft.) at the same concentration as the ethanol samples (which were set aside for GC-EI-QMS measurements). The unstable substances with active hydrogens were derivatized via silylation by adding one part of anhydrous pyridine to two parts of ethyl-acetate sample and two parts of N,O-bis(trimethylsilyl)trifluoracetamide (BSTFA) (+1% trimethylchlorosilane, TMCS) (both chemicals were the products of Merck KGaA). The mixture was vigorously shaken for one minute. The analysis of samples was carried out via GC-EI-QMS measurements.

Analytical Methods

For the tentative identification of extractables from polyester-based compounds, gas chromatographic (GC) measurements were performed, as a mass spectrometer (MS) detector equipped with an electron impact ion source (EI) and quadrupole analyzer (Q) was applied. The GC-EI-QMS system was the product of Thermo Fisher Scientific™ Inc. (Waltham, Massachusetts, USA), of which the GC was a Trace™ 1310 instrument with an AI 1310 autosampler, and the type of the MS detector was ISQ 7000.

The heat stable extracted compounds were directly analyzed from the concentrated absolute ethanol solutions. One microliter aliquots of samples were introduced to the 300° C. heated split/splitless injector of GC. Splitless injection mode was applied. The flow of hydrogen carrier gas (purity: 5.0, Messer Hungarogáz Kft. Budapest, Hungary) was set at 1.5 mL/min. This flow rate was held constant for the entire time of analysis. The separation of compounds was performed by means of a 30 m×250 m×0.25 µm dimension (length×I.D.× film thickness) capillary analytical column with 5% phenylated polydimethylsiloxane stationary phase (Trace-GOLD™ TG-5SilMS, Thermo Fisher Scientific™ Inc.). The temperature program of the oven started from 40° C. (held for 1.5 min), then the temperature increased at a rate of 10° C./min to 320° C. The final temperature was held for 20 min. The temperature of MS transfer line was set at 320° C., while the ion source was heated to 250° C. Scan data acquisition started after the fifth minute of analysis in the m/z range of 50-550.

The silylated samples were also analyzed with GC-EI-QMS, but with a slightly different instrument method. The oven heat program started from 30° C. (held for 2 min), then the temperature was raised to 320° C. at a 10° C./min rate.

The heating program ended with a 20 min long isotherm phase. The MS data acquisition started after 8 minutes, in the range of 50-1100 m/z.

Screening Analysis of Extractables with GC-EI-QMS

The tentative identification of migrated compounds was accomplished with NIST 20 (version: 2.4) spectral library search. For the correction of volumetric errors (i.e., the unequal evaporation rate) and the approximation of extracted concentrations, the peak of n-hexadecane ISTD was used as reference. The chromatograms of SCG-containing samples were confronted with the results of neat, but injection molded PHB and PLA. During the evaluation, only the different or significantly higher peaks of the filler containing compounds' chromatograms were considered.

Qualitative Analysis

The chromatograms of SCG-containing compounds inarguably proved the extractability of some coffee substances under the applied circumstances. These substances were mostly saturated and unsaturated fatty acids or their derivatives, such as esters, di- and triglycerides. The most commonly tentatively identified fatty acid was palmitic acid (n-hexadecanoic acid, CAS RN®: 57-10-3), followed by linoleic acid (cis-9,cis-12-octadecadienoic acid, CAS RN®: 60-33-3), oleic acid (cis-9-octadecenoic acid, CAS RN®: 112-80-1) and stearic acid (n-octadecanoic acid, CAS RN®: 57-11-4). The origin of fatty acids, di- and triglycerides was most probably the remaining coffee oil in the spent coffee ground filler.

Besides the fatty acid related substances, the presence of some phytosterols, such as stigmasterol (CAS RN®: 83-48-7), campesterol (CAS RN®: 474-62-4) and β-sitosterol (83-46-5) in the samples can be assumed. The occurrence of these compounds in coffee have already been proven by e.g., Nagasampagi et. al. (Nagasampagi, B. A., et. al. "Sterols of Coffee." *Phytochemistry*, Vol. 10, no. 5 (1971), pp. 1101-1107. doi: 10.1016/S0031-9422(00)89946-X).

A characteristic diterpenoid of coffee, kahweol (CAS RN®: 6894-43-5) was also tentatively identified in the SCG-containing samples' extract.

Present mostly in plastics with high filler content (≥15%), aromatic substances were also extracted. These aromatic compounds are likely the degradation products of phenolic antioxidants, since materials such as 3,5-di-tert-butyl-4-hydroxyphenylpropionic acid (CAS RN®: 20170-32-5) and 2,6-di-tert-butyl-1,4-benzoquinone (CAS RN®: 719-22-2) were found. The aromatic phenolic antioxidants were likely applied during the polymer resin manufacturing to improve the stability of granules. The reason of higher extractable amounts of plastic additive degradation products from the filler containing plastics must be the increased solvent uptake due to the presence of SCG.

Quantitative Analysis

Measurements and evaluation were performed using Chromeleon™ 7 (version: 7.3.1) software by Thermo Fisher Scientific™ Inc.

Evaluation of Results

Swelling degree of the plastic test specimens $$SD\ \% = \frac{m_{post} - m_{pre}}{m_{pre}} \cdot 100 \quad (3)$$

Gravimetric determination of the sum of extractables $$M_{extractables} = 1.1 \cdot m_{drysample} - m_{vial} \quad (4)$$

The approximate amount of extractables in the samples was calculated by expressing their concentration in nC16 equivalent. The evaluation proved that the most abundant extractables were the fatty acids in all cases. Moreover, the amount of extractable substances elevated with the filler content. Considering the most abundant migrant, palmitic acid, its amount increased with a 5.5 factor as the result of SCG content elevation from 5 to 20% in PHB. Even in the case of the PHB+20SCG sample, the concentration of palmitic acid (expressed in nC16 equivalent) was approximately 23 µg/mL. Besides the concentrations, the number of SCG-related tentatively identified peaks increased with the filler content. This means that while in the PHB+5SCG sample only 7 SCG-related substances were found, the number of extractable chemicals from PHB+20SCG increased to 28. This number was even higher for the PLA-based compound.

Figure 13A:
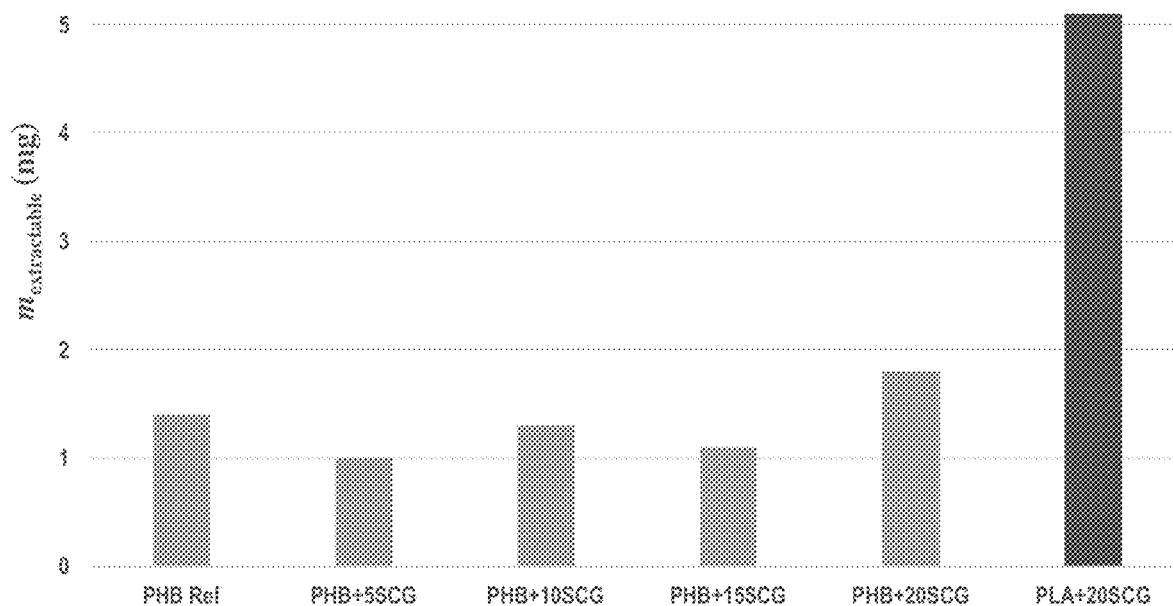
FIGS. 13(A)-13(B) show the results of a gravimetric analysis of the weight of extracted material (FIG. 13(A)) and the swelling degree of the samples (FIG. 13(B)) from Example 15.
Figure 13B:
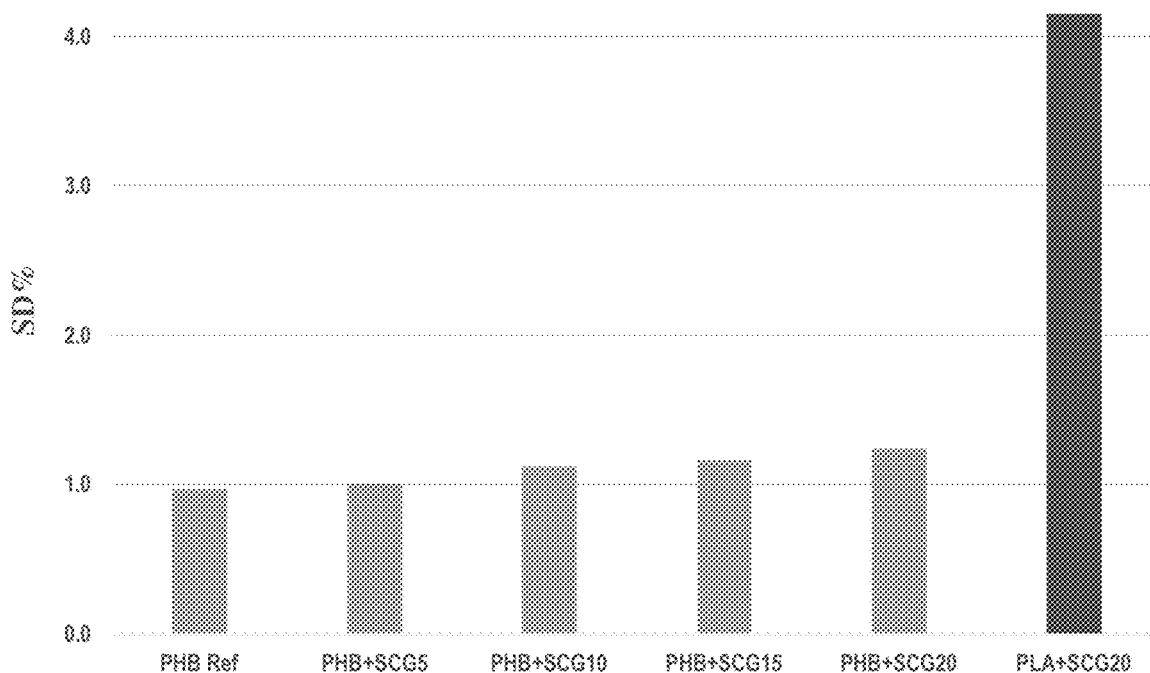

The gravimetric analysis resulted in a sum of extractable weight of 1.11-2.00 mg from the PHB-based samples. The PLA sample released 5.67 mg of extracted material. This trend is in good correlation with the swelling degree (SD %, equation (3)) of samples (FIGS. 13(A)-13(B)), where FIGS. 13(A)-13(B) illustrate the results of a gravimetric analysis of the weight of extracted material (FIG. 13(A)) and the swelling degree of the samples (FIG. 13(B)).

In the investigation of extractables from five "C"-SCG filler containing injection molded samples, several possible migrating compounds were tentatively identified. Despite the number of substances, none of them can be considered as potentially harmful for human health, since mostly fatty acids, their derivatives and phytosterols were found, or such compounds that are natural components of coffee. The tentatively identified substances originate from the coffee bean and are consumed on a daily basis by the coffee drinking populace.

The current study presented a wide range of the possible filler-originating leaching components from the packaging made from the "C"-SCG filler containing compounds, to the products (e.g., food, cosmetics, pharmaceuticals). In the case of the PHB-based injection molds, an average of 1.5 mg extractable was determined with gravimetric analysis, which means approx. 0.2% mass loss of the investigated test specimens. The same ratio was 0.75% in the case of PLA-based compound. The determination of extractables overestimate the worst foreseeable storage conditions; therefore, the migration is unlikely to reach the levels presented in this experiment.

There are several advantages in the above-described methods and products. The extraction method of various organic components allows for the omission of the drying step, making it economically more favorable than conventional processes. In addition, in most extraction conventional processes, the residue remaining after the extraction is discarded. In the present methods and products, the processed residual material can be suitable as an additive and/or filler for the production of biopolymer products and/or compounded biomass-polymer blends with improved properties when compared to the native polymer. It was entirely unexpected that the lignocellulosic biomass residue provides excellent interfacial adhesion between the fiber and polymer matrix, without the use of more complicated and expensive processing techniques.

What is claimed is:

1. A method of compounding a lignocellulosic biomass residue with a polymer comprising:
    a. providing the lignocellulosic biomass residue and the polymer to a compounding vessel, wherein the lignocellulosic biomass residue has a moisture content of from about 0% to about 15% by weight and comprises lignin in an amount of from about 30% to about 80% by weight, lipids in an amount of less than about 10% by weight, polyphenols in an amount of less than about 5% by weight, hemicellulose in an amount of from about 5% to about 35% by weight and cellulose in an amount of from about 5% to about 35% by weight;

b. compounding the lignocellulosic biomass residue with the polymer to produce a compounded biomass-polymer blend; and c. optionally processing the compounded biomass-polymer blend to produce a biopolymer product.

2. The method of claim 1 wherein an amount of lignocellulosic biomass residue is in a range of from about 1% to about 45% by weight.

3. The method of claim 1 wherein an average particle size of a lignocellulosic biomass residue is in a range of from about 0.1 μm to 2000 μm.

4. The method of claim 1 wherein the polymer is selected from a group consisting of polyacrylic acids, polyalcohols, polyalkalenes, polyalkalene oxides, poly(alkyl)acrylates, poly(alkylene) vinyl alcohols, polyamides, polycarbonates, polydepsipeptides, polydihydropyrans, poly(ester anhydrides), polyesteramides, polyesters, polyhydroxyalkanoates, polyethers, polyhydroxyacids, polymeric carbohydrates, polyorthoesters, polypeptides, polyphosphates, polypyrrolidones, polysaccharide derivatives, polysaccharides, polyurethanes, polyvinylalcohols, copolymers thereof, terpolymers thereof, mixtures thereof and combinations thereof.

5. The method of claim 1 wherein the biopolymer further comprises at least one component selected from a group consisting of acid scavengers, activated carbon, additives, adhesives, adsorbents, agglomerants, antiaging agents, antifogging agents, anti-hydrolysis agents, antioxidants, antistatic agents, aromatic chemicals, binders, biocides, brighteners, carbohydrates, catalysts, chain extenders, clays, coatings, colorants, complexing agents, coupling agents, crosslinking agents, crystallization accelerators, crystallization retarders, cyclodextrins, delustering agents, dyes, elastomers, electromagnetic radiation absorbers, electromagnetic radiation stabilizers, emulsifiers, enzymes, expanders, extenders, fibers, fillers, films, flame retardants, flocculants, fluorescent brightening agents, foams, fuels, glide agents, glues, g urns, impact modifiers, indicators, lubricants, minerals, monomer or other starting substances, natural biopolymers, nonbiodegradable components, nonbiological components, nucleating agents, odor masking agents, oligomers, organic and inorganic pigments, paints, pelletizing additives, plasticizers, plastics, polymer production aids, polymerization aids, polysaccharides, powders, processing aids, proteins, release agents, resins, rubbers, salts, sand, sequestrants, slip agents, stabilizers, starches, surfactants, tackifying resins, thermal stabilizers, toxin binders, viscosity stabilizers, waxes, mixtures thereof and combinations thereof.

6. The method of claim 1 wherein the biopolymer product and/or the compounded biomass-polymer blend has an oxygen transmission rate and a water vapor transmission rate of at least a two-fold decrease, when compared to the oxygen transmission rate and the water vapor transmission rate of the native polymer.

7. The method of claim 1 wherein the biopolymer product and/or the compounded biomass-polymer blend comprises at least one lignocellulosic biomass/polymer interface having an interfacial shear strength of from about 0.2 to about 120 MPa.

* * * * *